United States Patent
Li et al.

(10) Patent No.: US 9,391,554 B2
(45) Date of Patent: Jul. 12, 2016

(54) CONTROL OF A PERMANENT MAGNET SYNCHRONOUS GENERATOR WIND TURBINE

(75) Inventors: Shuhui Li, Tuscaloosa, AL (US); Tim A. Haskew, Northort, AL (US)

(73) Assignee: University of Alabama, Tuscaloosa, AL (US)

( * ) Notice: Subject to any disclaimer, the term of this patent is extended or adjusted under 35 U.S.C. 154(b) by 0 days.

(21) Appl. No.: 13/218,311

(22) Filed: Aug. 25, 2011

(65) Prior Publication Data

US 2012/0056602 A1    Mar. 8, 2012

Related U.S. Application Data

(60) Provisional application No. 61/376,939, filed on Aug. 25, 2010.

(51) Int. Cl.
| | |
|---|---|
| *H02P 9/48* | (2006.01) |
| *H02P 9/02* | (2006.01) |
| *H02P 101/15* | (2015.01) |
| *H02P 21/00* | (2016.01) |

(52) U.S. Cl.
CPC ... *H02P 9/48* (2013.01); *H02P 9/02* (2013.01); *H02P 21/00* (2013.01); *H02P 2101/15* (2015.01)

(58) Field of Classification Search
CPC ............ H02P 9/48; H02P 9/305; H02P 3/386
USPC ..................................... 322/89, 44
See application file for complete search history.

(56) References Cited

U.S. PATENT DOCUMENTS

| | | |
|---|---|---|
| 5,252,029 A | 10/1993 | Barnes |
| 5,652,485 A * | 7/1997 | Spiegel et al. ................. 318/147 |
| 5,798,631 A | 8/1998 | Spee et al. |
| 6,118,678 A | 9/2000 | Limpaecher et al. |
| 6,765,315 B2 | 7/2004 | Hammerstrom et al. |
| 6,972,972 B2 | 12/2005 | Duncan |
| 7,042,110 B2 | 5/2006 | Mikhail et al. |

(Continued)

FOREIGN PATENT DOCUMENTS

WO    2008/137836    11/2008

OTHER PUBLICATIONS

Abo-Khalil, A., et al., "DC-Link Copacitance Estimation in AC/DC/AC PWM Converters Using Voltage Injection," IEEE Transactions on Industry Applications, Sep./Oct. 2008, pp. 1631-1637.

(Continued)

*Primary Examiner* — Joseph Waks
*Assistant Examiner* — Sean Gubber
(74) *Attorney, Agent, or Firm* — Meunier Carlin & Curfman LLC

(57) ABSTRACT

Aspects of the disclosure relate to a control approach that utilizes a direct-current-based d-q vector control technology for variable-speed PMSG wind turbines based on full voltage source PWM converters. The control approach can be based on a nonlinear programming configuration for attaining a desired performance of PMSG wind turbine under operation constraints. The control approach can comprise a PMSG control unit that exploits fuzzy, adaptive, and PID control technologies in an optimal or nearly optimal control configuration. The control approach provides a smart wind turbine control technology that can be based on virtual lookup tables for effective PMSG power extraction.

18 Claims, 24 Drawing Sheets

(56) References Cited

U.S. PATENT DOCUMENTS

| | | | |
|---|---|---|---|
| 7,205,676 | B2 | 4/2007 | Ichinose |
| 7,233,129 | B2 | 6/2007 | Erdman et al. |
| 7,321,221 | B2 | 1/2008 | Bücker et al. |
| 7,339,355 | B2 | 3/2008 | Erdman et al. |
| 7,417,333 | B2 | 8/2008 | Miller et al. |
| 7,432,686 | B2 | 10/2008 | Erdman et al. |
| 7,471,007 | B2 | 12/2008 | Bucker et al. |
| 7,518,257 | B2 | 4/2009 | Guey et al. |
| 7,535,120 | B2 | 5/2009 | Erdman et al. |
| 7,629,705 | B2 | 12/2009 | Barker et al. |
| 7,656,135 | B2 | 2/2010 | Schram et al. |
| 7,830,127 | B2 | 11/2010 | Pereira et al. |
| 7,881,079 | B2 | 2/2011 | Prasad et al. |
| 8,008,793 | B2* | 8/2011 | Andresen ............... 290/44 |
| 8,030,791 | B2 | 10/2011 | Lang et al. |
| 8,058,753 | B2 | 11/2011 | Achilles et al. |
| 8,116,914 | B2 | 2/2012 | Oohara et al. |
| 2003/0205989 | A1* | 11/2003 | Garrigan et al. ............ 322/28 |
| 2008/0129050 | A1* | 6/2008 | Guey et al. ................ 290/43 |
| 2008/0137383 | A1* | 6/2008 | Chang et al. .............. 363/37 |
| 2008/0150285 | A1* | 6/2008 | Pereira et al. ............. 290/44 |
| 2008/0238108 | A1 | 10/2008 | Edelson et al. |
| 2009/0146426 | A1* | 6/2009 | Jones et al. ............... 290/44 |
| 2009/0187282 | A1 | 7/2009 | Menke et al. |
| 2010/0025995 | A1* | 2/2010 | Lang .............. H02M 5/4505 290/44 |
| 2011/0018270 | A1 | 1/2011 | Pereira et al. |
| 2011/0057444 | A1 | 3/2011 | Dai et al. |
| 2011/0156388 | A1 | 6/2011 | Yasugi et al. |
| 2011/0175354 | A1* | 7/2011 | Bo et al. ................... 290/44 |
| 2011/0316490 | A1 | 12/2011 | Lang et al. |
| 2012/0056602 | A1 | 3/2012 | Li et al. |
| 2012/0112551 | A1 | 5/2012 | Li et al. |
| 2012/0299305 | A1* | 11/2012 | Brogan et al. ............. 290/55 |

OTHER PUBLICATIONS

Ackermann, T. et al., An Overview of Wind Energy-Status, Renew Sustain Energy Rev., vol. 6, No. 1-2, Feb./Apr. 2002, pp. 67-128.

Agrawal, A.K., et al., "Study of Wind Turbine Driven DFIG Using AC/DC/AC Converter," Thesis for Bachelor of Technology in Electrical Engineering at Department of Electrical Engineering, National Institute of Technology, Rourkela, 2009, 66 pages.

Baggu, M.M., "Advanced Control Techniques for Doubly FED Induction Generator-Based Wind Turbine Converters to Improve Low Voltage Ride-Through During System Imbalances," Dissertation for Doctor of Philosophy in Electrical Engineering, Missouri University of Science and Technology, 2009, 148 pages.

Dong, D., "Modeling and Control Design of Bidirectional PWM Converter for Single-Phase Energy Systems," Thesis for Master of Science in Electrical Engineering at Virginia Polytechnic Institute and State University, May 2009, 114 pages.

Duarte, J.L., et al., Reference Frames Fit for Controlling PWM Rectifiers, IEEE Trans. Ind. Electron., vol. 46, No. 3, Jun. 1999, pp. 628-630.

GE Wind Energy, GE Wind Turbine Brochures, Jan. 12, 2012, 62 pages.

Hansen, A.D., et al., "Overall Control Strategy of Variable Speed Double-Fed Induction Generator Wind Turbine," Grid integration and electrical systems of wind turbines and wind farms (CD-ROM), Nordic Wind Power Conference, Chalmers University of Technology, Götborg, Sweden, Mar. 1-2, 2004, 7 pages.

Hansen, L.H., et al., "Conceptual Survey of Generators and Power Electronics for Wind Turbines," Risø National Laboratory, Roskilde, Denmark, Tech. Rep. Risø-R-1205(EN), ISBN 87-55002743-8, Dec. 2001, 108 pages.

Hopfensperger, B., et al., "Stator Flux Oriented Control of a Cascaded Doubly-Fed Induction Machine," IEE Proc. Electr. Power Appl., vol. 146, No. 6, Nov. 1999, pp. 597-605.

Kazachkov, Y.A., et al., "Modeling Wind Farms for Power system Stability Studies," Proceedings of 2003 IEEE PES General Meeting, Toronto, Canada, Jul. 13-17, 2003, pp. 1526-1533.

Kling, W.L., et al., "Wind Turbines as Power Plants," Proceedings of the IEEE/Cigré workshop on Wind Power and the Impacts on Power Systems, Oslo, Norway, Jun. 17-18, 2002, 7 pages.

Kulka, A., "Sensorless Digital Control of Grid Connected Three Phase Converters for Renewable Sources," Thesis for Degree of Philosophiae Doctor, Department of Electric Power Engineering, Norwegian University of Science and Technology, Mar. 2009, 157 pages.

Li, S., et al., "A Simulation Study of Double-Fed Induction Generator for Wind Energy Conversion Using PSpice," Proceedings of 2006 IEEE PES General Meeting, Montreal, Quebec, Canada, Jun. 18-22, 2006, pp. 1-8.

Li, S., et al., "Analysis of Decoupled d-q Vector Control in DFIG Back-to-Back PWM Converter," IEEE Power Engineering Society General Meeting, Tampa, Florida, USA, 2007, 7 pages.

Li, S., et al., "Transient and Steady-State Simulation Study of Decoupled d-q Vector Control in PWM Converter of Variable Speed Wind Turbine," The 33$^{rd}$ Annual Conference of the IEEE Industrial Electronics Society (IECON), Taipei, Taiwan, Nov. 5-8, 2007, pp. 2079-2086.

Malinowski, M., et al., "Simple Control Scheme of Three-Level PWM Converter Wind Turbine with Grid," Nordic Wind Power Conference, Götborg, Sweden, 2004, 6 pages.

Meirhaeghe, P.V., "Double Fed Induction Machine: a EUROSTAG Model," Tractebel Engineering, 2003, 8 pages.

Miller, Nicholas W., et al., "Dynamic Modeling of GE 1.5 and 3.6 Wind Turbine-Generators," Version 3.0, Power Systems Energy Consulting (PSEC), General Electric International, Inc., Oct. 27, 2003, 31 pages.

Morel, L., et al., Double-Fed Induction Machine: Converter Optimization and Field Oriented Control without Position Sensor, IEE Proc. Electr. Power Appl., vol. 145, No. 4, Jul. 1998, pp. 360-368.

Nordex, Nordex Wind Turbine Brochures, Jan. 12, 2012, 38 pages.

Park, Hong-Geuk, et al., "Cost-Effective Converters for Micro Wind Turbine Systems Using PMSG," Journal of Power Electronics, vol. 8, No. 2, Apr. 2008, pp. 156-162.

Pena, R.S., et al., "Control Strategies for Voltage Control of a Boost Type PWM Converter," 2001 IEEE Power Electronics Specialist Conference, vol. 2, 2001, pp. 730-735.

Pena, R., et al., Doubly Fed Induction Generator Using Back-to-Back PWM Converters and its Application to Variable-Speed Wind-Energy Generation, IEE Proc. Electr. Power Appl., vol. 143, No. 3, May 1996, pp. 231-241.

Raju, A.B., et al., "A Simple Maximum Power Point Tracker for Grid Connected Variable Speed Wind Energy Conversion System With Reduced Switch Count Power Converters," IEEE 34$^{th}$ Annual Power Electronics Specialist Conference, vol. 2, Jun. 2003, pp. 748-753.

"SimPowerSystems User's Guide," Version 3, The MathWorks, Sep. 2003, 620 pages.

Slootweg, J.G., et al., "General Model for Representing Variable Speed Wind Turbines in Power System Dynamics Simulations," IEEE Trans. On Power Syst., vol. 18, No. 1, Feb. 2003, pp. 144-151.

Song, Seung-Ho, et al., "Implementation and Control of Grid Connected AC-DC-AC Power Converter for Variable Speed Wind Energy Conversion System," Eighth Annual IEEE Applied Power Electronics Conference and Exposition, vol. 1, Feb. 2003, pp. 154-158.

Thiringer, T., et al., "Grid Disturbance Response of Wind Turbines Equipped with Induction Generator and Doubly-Fed Induction Generator," Proceedings of 2003 IEEE PES General Meeting, Toronto, Canada, Jul. 13-17, 2003, 6 pages.

Usaola, J., et al., "Transient Stability Studies in Grids with Great Wind Power Penetration: Modeling Issues and Operation Requirements," Proceedings of 2003 IEEE PES General Meeting, Toronto, Canada, Jul. 13-17, 2003, pp. 1-8.

Velpuri, A.N., et al., "AC/DC/AC Converter Modulation Strategy With Natural Zero Sequence Rejection Using Only One Six-Switch Inverter Module," IEEE International Conference on Electric Machines and Drives, vol. 2, May 2007, pp. 1226-1233.

Vestas, Vestas Wind Turbine Brochures, Jan. 12, 2012, 132 pages.

Wang, S., et al., "Stability Analysis of Field Oriented Doubly-Fed Induction Machine Drive Based on Computer Simulation," Electric Machines and Power Systems, vol. 21, No. 1, 1993, pp. 11-24.

(56) References Cited

OTHER PUBLICATIONS

Weiss, G., et al., "H∞ repetitive control of DC-AC converters in micro-grids, IEEE Conference on Decision and Control," Dec. 2002, 16 pages.

Xu, D., et al., "A Novel AC-DC Converter for PMSG Variable Speed Wind Energy Conversion System," IEEE 6th International Power Electronics and Motion Control Conference, May 2009, 8 pages.

Xu, L., et al., Torque and Reactive Power Control of a Doubly Fed Induction Machine by Position Sensorless Scheme, IEEE Trans. Ind. Appl., vol. 31, No. 3, May/Jun. 1995, pp. 636-642.

U.S. Appl. No. 12/532,890, filed Nov. 3, 2009.

Final Office Action, dated Jun. 21, 2013, in connection with U.S. Appl. No. 12/532,890.

Response to final Office Action, dated Jul. 17, 2013.

Non-final Office Action, dated Aug. 30, 2012, in connection with U.S. Appl. No. 12/532,890.

Response to non-final Office Action, dated Feb. 28, 2013.

International Search Report, dated Aug. 8, 2008, in connection with International Application No. PCT/US2008/062641.

International Preliminary Report on Patentability and Written Opinion, Nov. 10, 2009, in connection with International Application No. PCT/US2008/062641.

* cited by examiner a) Stator d-axis current   b) Stator q-axis current

Stator d-q current characteristics ($V_{sd}$ = -1.0 pu to 0pu, $\Delta V_{sd}$ = 0.1pu, $V_{sq}$ = 0.8pu)

a) Generator rotor speed b) Stator d- and q-axis current waveforms c) Stator real and reactive power Performance of conventional PMSG current-loop controller with |v*_dq| exceeding the linear modulation limit at some conditions Performance of an embodiment of a PMSG current-loop controller PMSG system using converter switching model Performance of traditional PMSG control in switching condition Performance of novel PMSG control in switching condition A system block diagram for design of speed-loop controller PMSG speed control diagram Static curves used in peak power tracking control strategies using conventional and virtual lookup tables.

Generation of speed reference for peak power tracking control

A partial block diagram of an embodiment of the invention for the maximum wind power extraction a) Generator rotor and reference speeds b) Maximum extracted wind power, and stator active and reactive power c) Stator d and q currents d) Wind turbine efficiency PMSG maximum power extraction evaluation using power converter average model a) Generator rotor and reference speeds b) Maximum extracted wind power, and stator active and reactive power PMSG maximum power extraction evaluation using power converter switching model a) Wind speed b) Generator rotor and reference speeds c) Maximum extracted wind power, and stator active and reactive power d) Stator d and q currents e) Wind turbine efficiency PMSG maximum power extraction under variable and gust wind conditions A comprehensive PMSG wind turbine system in SimPowerSystems GSC and MSC for maximum power extraction and reactive power controls of a PMSG wind turbine (steady wind)

GSC and MSC for maximum power extraction and voltage support controls during a low voltage droop GSC and MSC for maximum power extraction and voltage support controls during a moderate voltage droop GSC and MSC for maximum power extraction and reactive power controls under variable and gust wind

CONTROL OF A PERMANENT MAGNET SYNCHRONOUS GENERATOR WIND TURBINE

CROSS REFERENCE TO RELATED PATENT APPLICATION

This application claims priority to U.S. Provisional Application No. 61/376,939 filed Aug. 25, 2010, herein incorporated by reference in its entirety.

BACKGROUND

1. Field

Embodiments relate generally to control systems and more specifically, yet not exclusively to control of variable-speed direct-driven PMSG (permanent magnet synchronous generator) wind turbines.

2. Background

Wind power is today's most rapidly growing renewable energy source. Large-scale wind generation facilities have become a very visible component of the interconnected power grid in many portions of the United States and around the world. Wind turbines can operate at either fixed speed or variable speed. For a fixed-speed wind turbine, the generator is directly connected to the electrical grid. For a variable speed wind turbine, the generator is controlled by power electronic equipment. The two most-common variable speed wind turbines are wind turbines that use direct-driven synchronous generators (DDSG) or double-fed induction generators (DFIG). For both of them, a frequency converter such as a pulse-width modulation (PWM) AC/DC/AC frequency converter is connected between the grid and the generator. FIG. 1A illustrates an embodiment of an AC/DC/AC converter in modern variable-speed synchronous generator wind turbine, and FIG. 1B illustrates an embodiment of an AC/DC/AC converter in variable-speed DFIG wind turbine. For a DDSG wind turbine, the converter is connected between the generator and the grid, as shown in FIG. 1A, and for the DFIG wind turbine, the converter is connected between the rotor circuit and the grid, as shown in FIG. 1B. Traditionally, each of these two PWM converters is controlled by using decoupled d-q control approaches, as are known in the art. Basically, the machine-side converter controls the real and reactive power production of the electric generator, and the grid-side converter controls the dc-link voltage and the reactive power absorbed from the grid by the converter. The general control technique for the grid-side converter control, which is widely used in wind power industry, is a decoupled d-q control approach that uses the direct (d) axis current component for real power control and quadrature (q) axis current component for reactive power control. By controlling the converters on both sides, characteristics can be adjusted so as to achieve maximum of effective power conversion or capturing capability for a wind turbine and to control its power generation with less fluctuation.

The variable speed wind turbine with a multi-pole permanent magnet synchronous generator (PMSG) and full-scale power converter is considered to be a promising, but not yet very popular wind turbine concept. A multi-pole synchronous generator connected to a power converter can operate at low speeds, so that a gearbox can be omitted. Because a gearbox causes higher weight, losses, costs and maintenance, a gearless construction represents an efficient and robust solution. Moreover, due to the permanent magnet excitation of the generator, the DC excitation system can be eliminated. The efficiency of a PMSG wind turbine is thus assessed to be higher than other variable-speed wind turbine concepts. In addition, a full scale insulated-gate bipolar transistor (IGBT) back-to-back voltage source converter, by which the generator is connected to the power grid, allows full controllability of the system. Due to the intensified grid codes such as strong short-circuit ride-through capability, wind turbines with full scale power converters are favored in the future compared to wind turbine concepts using doubly-fed induction generators.

However, the energy captured and converted from the wind by a PMSG wind turbine depends not only on the synchronous generator but also on the integration of aerodynamic, electrical and power converter systems of the wind turbine as well as how they are controlled under variable wind conditions. At present, commercial PMSG technology mainly uses a passive rectifier followed by an IGBT inverter. FIG. 1C illustrates an embodiment of the structure of a PMSG system, which is comprised of a standard permanent magnet synchronous machine with the stator winding connected to the grid through a frequency converter. In modern PMSG wind turbine designs, the frequency converter can also be comprised of two self-commutated PWM converters, machine- and grid-side converters, with an intermediate DC voltage link. The DC-link created by the capacitor in the middle decouples the operation of the two converters, thus allowing their control and operation to be optimized. FIG. 1D illustrates a PMSG wind turbine with full-scale/fully-controllable PWM converters mainly comprising three parts: a wind turbine drive train, a permanent magnet synchronous generator, and a back to back voltage source PWM converter. In the turbine drive train, the rotor blades of a wind turbine catch wind energy that is then transferred to the generator. The generator, converting mechanical energy into electrical energy, is a standard synchronous machine with its stator windings connected to the grid through a frequency converter. The frequency converter is built by two current-regulated voltage-source PWM converters, a machine-side converter (MSC) and a grid-side converter (GSC), with a dc voltage link.

The control in a PMSG system has three levels: the generator level, the wind turbine level, and the central wind power plant level. At the generator level, each of the two PWM converters (FIG. 1D) is controlled through decoupled d-q vector control approaches as known in the existing technology. The MSC controls the PMSG to achieve the following goals: maximum energy extraction from the wind and/or compliance with a grid control demand. The GSC maintains a constant dc-link voltage and adjusts reactive power absorbed from the grid by the converter. At the wind turbine level, there is a speed controller and a power limitation controller. At low wind speed, the speed controller gives a power or torque reference to the MSC controller based on the principle of maximum energy capture. The power limitation controller increases or decreases the pitch angle of wind turbine blades to prevent the turbine from going over the rated power at a high wind speed. At the central wind power plant level, the power production of the entire plant is determined based on the grid requirements. The central control system sends out reference power signals to each individual wind turbine according to a grid need, while the local turbine control system ensures that the reference power signal sent by the central control system is reached. Thus, the performance of a PMSG wind turbine depends not only on the wind but also on how effectively the generator and the turbine aerodynamic system are coordinated under variable wind and complex control conditions. The control objectives of the machine-side converter include 1) maximum energy extraction from the wind, and 2) management of PMSG energy generation in compliance with grid demands. However, many of the approaches taken to control PMSG energy generation results in less than optimal energy generation of the PMSG wind turbine and less than optimal reliability, stability, and power quality of both, the PMSG and electric utility systems.

Therefore, what is desired are control systems and methods that overcome challenges present in the art, some of which are described above.

SUMMARY

Provided are methods and a system for a control approach that utilizes a direct-current-based d-q vector control technology for full-converter based variable-speed PMSG wind turbines; provides a control approach based on a nonlinear programming configuration for the best performance of PMSG wind turbine under practical constraints; comprises a PMSG control system using fuzzy, adaptive, and PID control technologies in an optimal control configuration; and provides a smart wind turbine control technology for effective maximum power extraction from the wind.

Additional advantages will be set forth in part in the description which follows, and in part will be obvious from the description, or may be learned by practice. The advantages will be realized and attained by means of the elements and combinations particularly pointed out in the appended inventive concepts. It is to be understood that both the foregoing general description and the following detailed description are exemplary and explanatory only and are not restrictive, as claimed.

BRIEF DESCRIPTION OF THE DRAWINGS

The accompanying drawings, not drawn to scale, which are incorporated in and constitute a part of this specification, illustrate embodiment(s) and together with the description, serve to explain the principles of the methods and systems:

FIGS. 26A-26H illustrate GSC and MSC for maximum power extraction and reactive power controls of a PMSG wind turbine (steady wind);

DESCRIPTION OF THE PREFERRED EMBODIMENTS

Figure 1A:
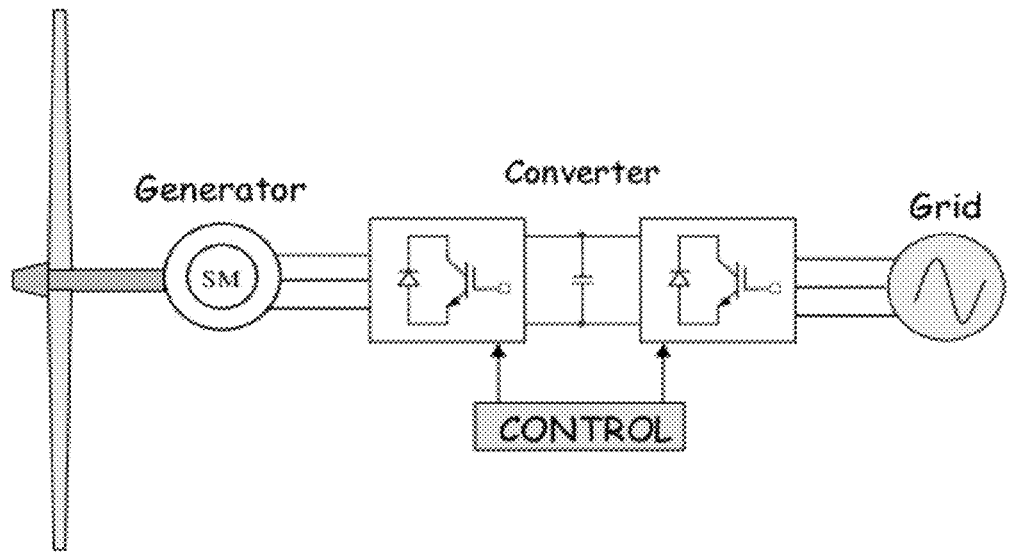
FIG. 1A illustrates an embodiment of a variable-speed synchronous generator wind turbine.
Figure 1B:
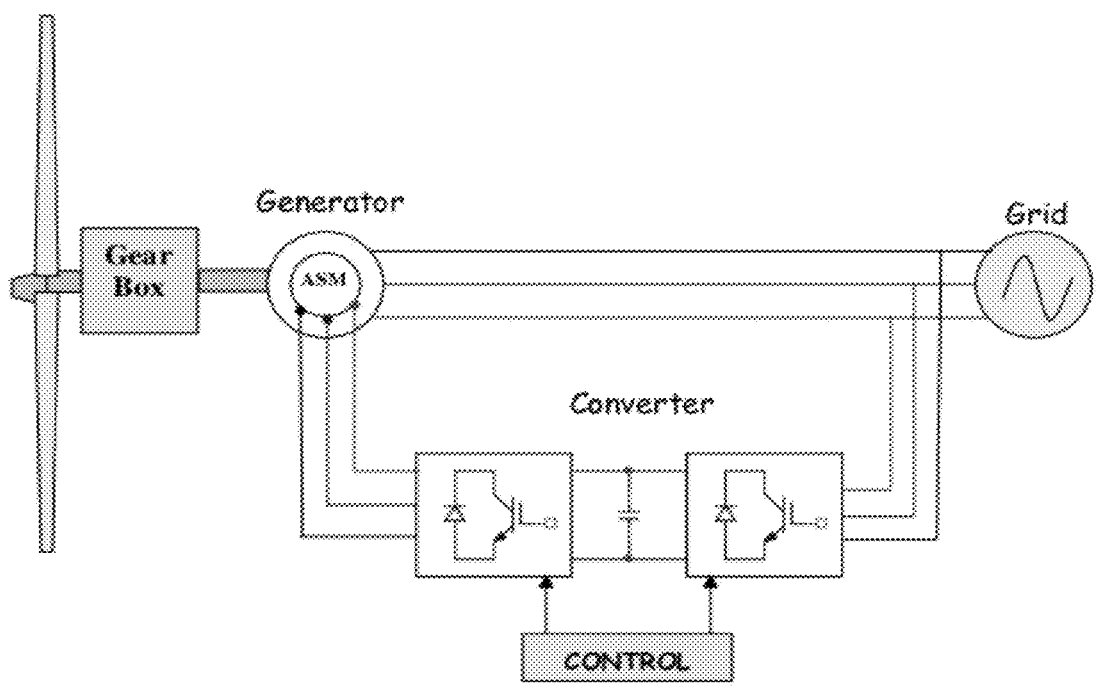
FIG. 1B illustrates an embodiment of a variable-speed doubly-fed induction generator wind turbine.
Figure 1C:
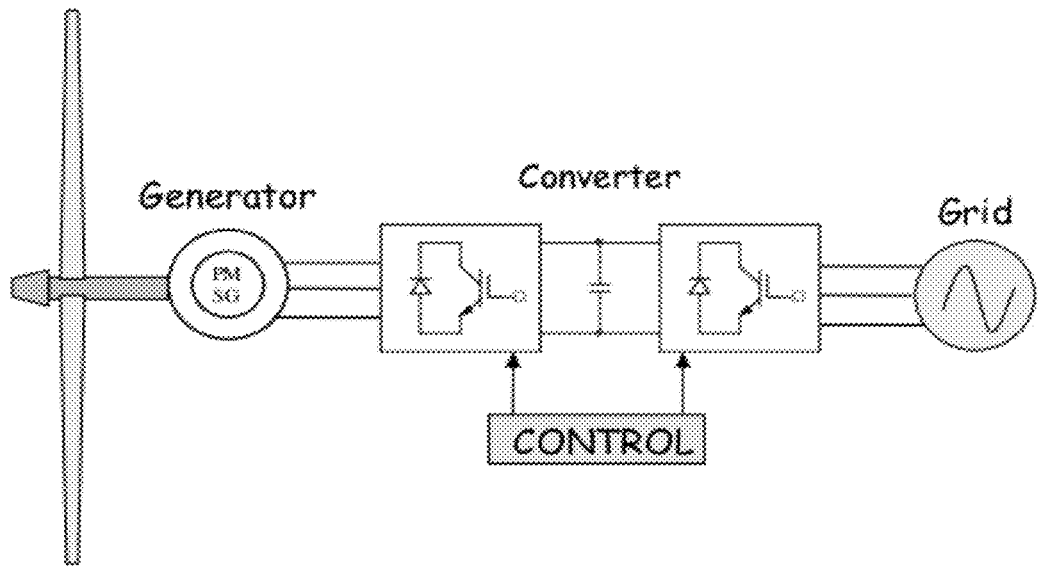
FIG. 1C illustrates an embodiment of the structure of a direct-driven PMSG system, which is comprised of a standard permanent magnet synchronous machine with the stator winding connected to the grid through a frequency converter.

The present methods and systems may be understood more readily by reference to the following detailed description of preferred embodiments of the methods and systems and the Examples included therein and to the Figures and their previous and following description.

As used in the specification and the appended claims, the singular forms "a," "an" and "the" include plural referents unless the context clearly dictates otherwise. Thus, for example, reference to "a" or "an" endpoint device may include two or more endpoint devices.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In this specification and in the claims which follow, reference will be made to a number of terms which shall be defined to have the following meanings: "Optional" or "optionally" means that the subsequently described event or circumstance may or may not occur, and that the description includes instances where said event or circumstance occurs and instances where it does not.

Reference will now be made in detail to the present embodiments according to the methods and systems, examples of which are illustrated in the accompanying drawings. Wherever possible, the same reference numbers are used throughout the drawings to refer to the same or like parts.

Various of the embodiments of the disclosure or aspects of such embodiments can be implemented as a method, a data processing system, or a computer program product. Accordingly, an embodiment (e.g., a unit, a system, a method) can take the form of an entirely hardware embodiment, an entirely software embodiment, or an embodiment combining software and hardware aspects. Furthermore, implementations of an embodiment described herein or aspects of the embodiment may take the form of a computer program product on a computer-readable storage medium having computer-readable program instructions (e.g., computer software) embodied in the storage medium. More particularly, implementations of the embodiments of the disclosure may take the form of web-implemented computer software. Any suitable computer-readable storage medium may be utilized including hard disks, CD-ROMs, optical storage devices, magnetic storage devices, etc.

The preferred embodiments according to the present methods and systems are described below with reference to block diagrams and flowchart illustrations of methods, apparatuses (e.g., systems) and computer program products. It will be understood that each block of the block diagrams and flowchart illustrations, and combinations of blocks in the block diagrams and flowchart illustrations, respectively, can be implemented by computer-executable instructions (e.g., computer program instructions). Such computer-executable instructions can be loaded onto a general purpose computer, special purpose computer, or other programmable data processing apparatus, such as the ones described below, to produce a machine, such that the instructions which execute on the computer or other programmable data processing apparatus create a means for implementing the functions specified in the flowchart block or blocks.

These computer-executable instructions also can be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer-executable instructions also can be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Generally and traditionally, the control design of a PMSG system is model based and/or uses the conventional standard vector control technology, wherein such conventional control technology generally presents efficiency issues, and stability and reliability concerns especially under variable wind and complex system conditions. The existing PMSG control technologies include (1) maximum torque control, (2) unity power factor control, and (3) constant stator voltage control.

Figure 2:
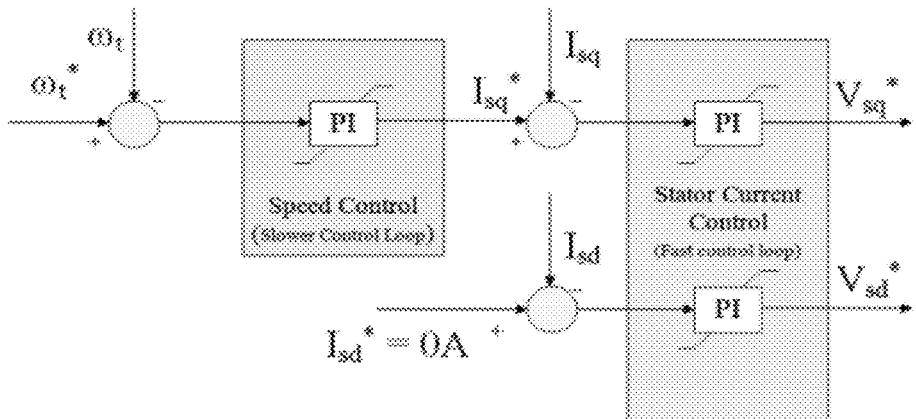
FIG. 2 illustrates a conventional PMSG maximum torque control strategy.

When using maximum torque control, the stator current is controlled to have the q-component only (FIG. 2). Thus, the generator provides the maximum possible torque. But, since the reactive power is not controlled, converter or generator power rating may be exceeded.

When using unity power factor control, the stator current is controlled to have both q and d components in such a way that stator reactive power from q and d current components can be canceled by each other. An advantage of this control strategy is that the generator is expected to operate with unity power factor. However, as the stator voltage is not controlled, stator voltage may exceed the rated voltage in case of an over speed plus a reduction of torque control capability.

When using constant stator voltage control, the stator voltage is controlled instead of the reactive power. Due to the constant stator voltage, there is no risk of over voltage. Nevertheless, disadvantages of this control again are (i) the reactive power demand of the generator that increases the converter power rating and (ii) reduced torque control ability and a low turbine capacity factor.

Therefore, each of the three traditional control approaches has at least one major shortcoming, which can affect PMSG wind turbine capacity factors and operation costs. In addition, another shortcoming common to all the three existing PMSG control technologies is a theoretical deficiency of the decoupled d-q control technique. In existing technology, the PMSG control system has a nested-loop structure using the rotor-flux-oriented reference frame (see, e.g., FIG. 2) with q-axis current component for torque, real power or DC link voltage control and d-axis current component for reactive power or other control purpose. The final d and q voltage control signals applied to the stator of the synchronous generator can be obtained by comparing the d-current and q-current setpoints to the actual PMSG stator d-current and q-current as shown by the second stage controller as shown in FIG. 2. Thus, the traditional control strategy generally intends to control the stator d-axis and q-axis currents through the decoupled d and q voltages, $v_{sd}'$ and $v_{sq}'$, respectively. Yet, some theoretical and computer simulation studies indicate that d-axis voltage is mainly supportive for q-axis current control, and q-axis voltage is primarily supportive for d-axis current control. Hence, traditional control approaches can be actually based on the compensation items rather than the PI loops to accomplish the PMSG control objectives.

Among the many advantages of embodiments of the methods and systems of the disclosure are: (1) an improved direct-current based d-q vector control technology that amends the deficiency of conventional decoupled d-q vector control technology; (2) an optimal or nearly-optimal control strategy for satisfactory system performance (e.g., best system performance) under practical system constraints; and (3) a smart control technology that adapts wind power generation and operation for the best performance under variable wind power generation conditions. Embodiments of the subject disclosure can integrate the advantages of all the three existing PMSG control technologies in a direct-current based optimal and smart control structure.

Other features of embodiments of methods and systems of the disclosure over conventional technology include a maximum wind power extraction control approach. Commercial wind turbines can operate primarily based on a lookup table approach for the peak power tracking control. The lookup table approach can apply a two-dimensional lookup table of power coefficient and power-mapping method to estimate the reference generator power or speed. However, in certain scenarios, a lookup table does not exactly correspond to how the real turbine blades perform. In one aspect, this may occur because of inaccurate aerodynamic calculations, tolerance in mounting the turbine, dirt or ice on blades, time-varying aerodynamic parameters, and other unpredictable parameter variations. In addition, a conventional lookup table approach is generally not suitable for peak power tracking control in a PMSG system.

Embodiments described herein integrate the conventional lookup table approach with a smart speed finding approach to identify the reference generator rotating speed for the maximum wind power extraction. Aspects of embodiments of the methods and systems related to maximum wind power extraction can comprise: (1) a virtual lookup table approach; (2) dynamic and smart formation of the virtual lookup table; (3) a nested speed and current control loop control structure that can quickly implement the maximum power extraction control objective using the virtual, dynamic and smart virtual lookup table approach; and (4) an implementation of the maximum power extraction control in the direct-current based d-q vector control environment.

The following sections describe embodiments of methods and systems of the subject disclosure, and include: (1) PMSG transient and steady-state models; (2) PMSG characteristics under d-q vector control; (3) conventional PMSG control strategy and deficiency; (4) direct-current based d-q vector control technology; and (5) deficiency conventional peak power control strategy and the maximum power extraction control in the direct-current based optimal and smart control configuration.

Generator Model—PMSG Transient and Steady-State Models in d-q Reference Frame

A commonly used PMSG transient model is the Park model, as known top one of ordinary skill in the art. Using the generator convention, the space vector theory yields stator voltage equations in the form:

$$\begin{pmatrix} v_{sd} \\ v_{sq} \end{pmatrix} = -R_s \begin{pmatrix} i_{sd} \\ i_{sq} \end{pmatrix} - \frac{d}{dt}\begin{pmatrix} \psi_{sd} \\ \psi_{sq} \end{pmatrix} + \omega_e \begin{pmatrix} 0 & -1 \\ 1 & 0 \end{pmatrix}\begin{pmatrix} \psi_{sd} \\ \psi_{sq} \end{pmatrix} \qquad (1)$$

where $R_s$ is the resistance of the stator winding; $v_{sd}$, $v_{sq}$, $\psi_{sd}$, and $\psi_{sq}$ are the d and q components of instantaneous stator voltages and fluxes; and $\omega_e$ is the angular speed of turbine rotor in electrical angle. If the d-axis is aligned along the rotor flux position, the stator flux linkages are $$\begin{pmatrix} \psi_{sd} \\ \psi_{sq} \end{pmatrix} = \begin{pmatrix} L_{ls}+L_{dm} & 0 \\ 0 & L_{ls}+L_{qm} \end{pmatrix}\begin{pmatrix} i_{sd} \\ i_{sq} \end{pmatrix} + \begin{pmatrix} \psi_f \\ 0 \end{pmatrix} \qquad (2)$$

where $L_{ls}$ is the leakage inductance of the stator winding; $L_{dm}$ and $L_{qm}$ are the stator and rotor d-axis and q-axis mutual inductances; $\psi_f$ is the flux linkage produced by the permanent magnet. When replacing Eq. (2) into Eq. (1), the stator voltage is $$\begin{pmatrix} v_{sd} \\ v_{sq} \end{pmatrix} = -R_s \begin{pmatrix} i_{sd} \\ i_{sq} \end{pmatrix} - \frac{d}{dt}\begin{pmatrix} L_d i_{sd} \\ L_q i_{sq} \end{pmatrix} + \omega_e \begin{pmatrix} -L_q i_{sq} \\ L_d i_{sd} + \psi_f \end{pmatrix} \qquad (3)$$

where $L_d=L_{ls}+L_{dm}$, and $L_q=L_{ls}+L_{qm}$; and $i_{sd}$ and $i_{sq}$ are the d and q components of instantaneous stator currents. Under the steady-state condition, Eq. (3) is reduced to $$\begin{pmatrix} V_{sd} \\ V_{sq} \end{pmatrix} = \begin{pmatrix} -R_s & -\omega_e L_q \\ \omega_e L_d & -R_s \end{pmatrix}\begin{pmatrix} I_{sd} \\ I_{sq} \end{pmatrix} + \begin{pmatrix} 0 \\ \omega_e \psi_f \end{pmatrix} \qquad (4)$$

where $V_{sd}$, $V_{sq}$, $I_{sd}$, and $I_{sq}$ are the d and q components of the steady-state stator voltage and current space vectors. In a scenario in which the q-axis lags d-axis by 90°, as normally occurs in the traditional analysis of a synchronous generator, the stator voltage space vector is $V_{ts\_dq}=V_{sq}+jV_{sd}$, the stator current space vector is $I_{s\_dq}=I_{sq}+jI_{sd}$, and the no-load stator voltage space vector is $V_{s\_dq}=E_f+j0=\omega_e\psi_f+j0$ that is aligned along the q axis. Here, j represents the imaginary unit, namely $(-1)^{1/2}$.

Figure 3:
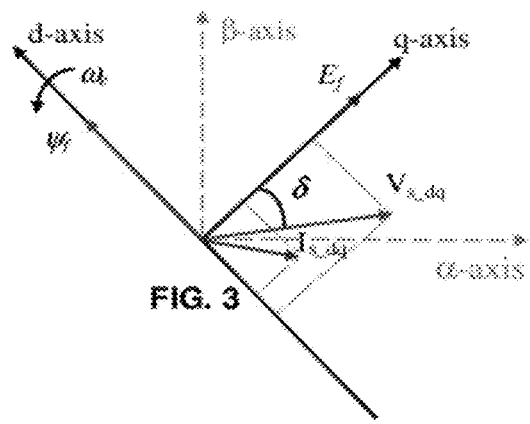
FIG. 3 is an illustration of space vectors in a PMSG.

An illustration of stator voltage, stator current, and rotor flux space vectors for an exemplary PMSG is shown by FIG. 3. The electromagnetic torque ($\tau_{em}$) and stator active and reactive power are given by equations (5), (6) and (7), respectively.

$$\tau_{em}=p(\psi_{sd}i_{sq}-\psi_{sq}i_{sd})=p(\psi_f i_{sq}+(L_d-L_q)i_{sd}i_{sq}) \qquad (5)$$

$$P_s=v_{sd}i_{sd}+v_{sq}i_{sq} \qquad (6)$$

$$Q_s=v_{sd}i_{sq}-v_{sq}i_{sd} \qquad (7)$$

In one scenario, the difference between the d-axis and q-axis mutual inductance is small for a direct driven multipole PMSG and, thus, the stator winding resistance is significantly smaller than the synchronous reactance. In such scenario, Eq. (5) reduces to Eq. (8), and the steady-state stator d-axis and q-axis currents obtained from Eq. (4) are shown by Eq. (9).

$$\tau_{em}=p\psi_f i_{sq} \qquad (8)$$

$$I_{sq}=-V_{sd}/(\omega_e L_q), I_{sd}=(V_{sq}-\omega_e\psi_f)/(\omega_e L_d) \qquad (9)$$

Equation (8) shows that, in the rotor-flux-oriented frame, the electromagnetic torque or the wind turbine speed should be controlled by regulating the stator q-axis current while Equation (9) indicates the stator d-axis current and q-axis current are controllable through stator q-voltage and d-axis voltage, respectively. Yet, in a scenario in which the stator winding resistance is considered, stator d-axis current and q-axis current obtained from Eq. (4) are Eqs. (10) and (11), respectively, which indicate that a change of either $V_{sd}$ or $V_{sq}$ can affect both stator d-axis current and q-axis current.

$$I_{sd} = (\omega_e L_q V_{sq} - R_s V_{sd} - \omega_e^2 L_q \psi_f)/(\omega_e^2 L_d L_q + R_s^2) \quad (10)$$

$$I_{sq} = (-\omega_e L_q V_{sd} - \omega_e R_s \psi_f)/(\omega_e^2 L_d L_q + R_s^2) \quad (11)$$

PMSG Stator Current Characteristics Under d-q Control

As shown in FIG. 2, the PMSG control is normally implemented through the decoupled d and q current-loop controllers while the final control action applied to the PMSG from the machine-side converter are stator d-axis and q-axis voltages, $V_{sd}$ and $V_{sq}$. Hence, for an effective control design and analysis of a practical PMSG, it is valuable to examine how $V_{sd}$ and $V_{sq}$ affect stator d current and q current characteristics through computer simulations by considering the effect of both stator winding inductance and resistance. In contrast to a conventional synchronous generator that operates at the synchronous speed $\omega_{syn}$ of the grid system, a PMSG can run both over and below $\omega_{syn}$ to generate electricity depending on wind turbine drive power and the stator d-q control voltage. Therefore, PMSG characteristics should be evaluated from variable "synchronous speeds" viewpoint under different d-q control conditions. For a given a generator speed and a control voltage, $V_{s\_dq} = V_{sq} + jV_{sd}$ pu, applied to the stator, the stator d-axis and q-axis currents are solved from Eqs. (10) and (11). As an example, the PMSG data used in an exemplary computer simulation is presented in Table 1. It should be appreciated that a feasible region for a PMSG on each individual characteristic curve as shown below should be those segments that are within the rated conditions, e.g., 1 pu.

TABLE 1

Typical PMSG data used in a exemplary computer simulation in accordance with aspects of the disclosure.

| Parameter | Value | Units |
|---|---|---|
| Rated Power | 2500 | kVA |
| Rated line voltage | 575 | V |
| Permanent magnet flux | 1.0 | pu |
| Mutual inductance in q-axis, $L_{qm}$ | 0.48 | pu |
| Mutual inductance in d-axis, $L_{dm}$ | 0.43 | pu |
| Stator leakage inductance, $L_{ls}$ | 0.02 | pu |
| Stator resistance, $R_s$ | 0.0025 | pu |
| Frequency | 60 | Hz | a. Stator Current Characteristics Under $V_{sd}$ Control

Figures 4A, 4B:
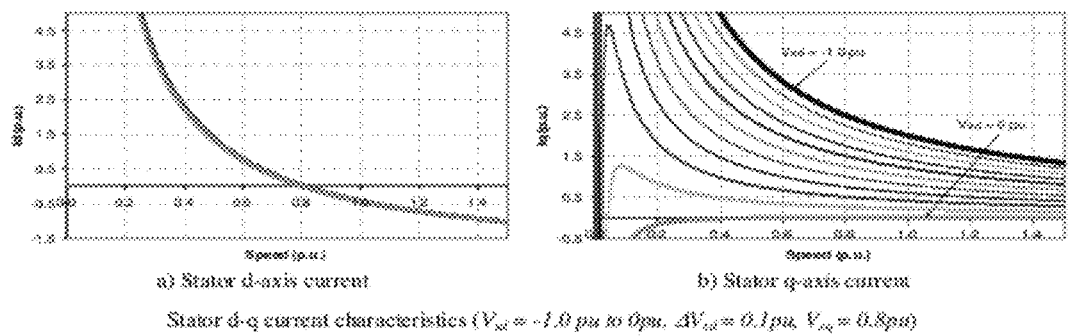
FIGS. 4A and 4B illustrate stator d-q current characteristics ($V_{sd}$=−1.0 pu to 0 pu, $\Delta V_{sd}$=0.1 pu, $V_{sq}$=0.8 pu)

The simulation-based analysis corresponding to $V_{sd}$ control represents a condition of variable $V_{sd}$ but constant $V_{sq}$. FIGS. 4A and 4B present typical stator d-axis and q-axis current characteristics as $V_{sd}$ of the stator voltage changes from −1.0 p.u. to 0 p.u. while $V_{sq}$ is fixed at 0.8 p.u. Analysis of results of the exemplary computer simulation yields the following regularities: (1) at a constant generator speed, the stator d-axis current almost remains constant as $V_{sd}$ changes (FIG. 4a), implying that it is impossible to control the stator d-axis current through $V_{sd}$ (consistent with Eq. (9)); (2) the stator q-axis current is clearly affected by $V_{sd}$ (FIG. 4b). Under a constant generator speed, the more negative $V_{sd}$ is, the higher the stator q-axis current (FIG. 4b). In other words, PMSG torque or speed can be controlled by regulating $V_{sd}$ (consistent with Eqs. (8) and (9)); (3) under a condition of a constant stator q-axis current in the generating mode, the higher the generator speed, the more negative $V_{sd}$ is. In other words, for the same torque control demand, the machine-side converter is closer to its linear modulation limit at a high generator speed.

b. Stator Current Characteristics Under $V_{sq}$ Control

Figures 5A, 5B:
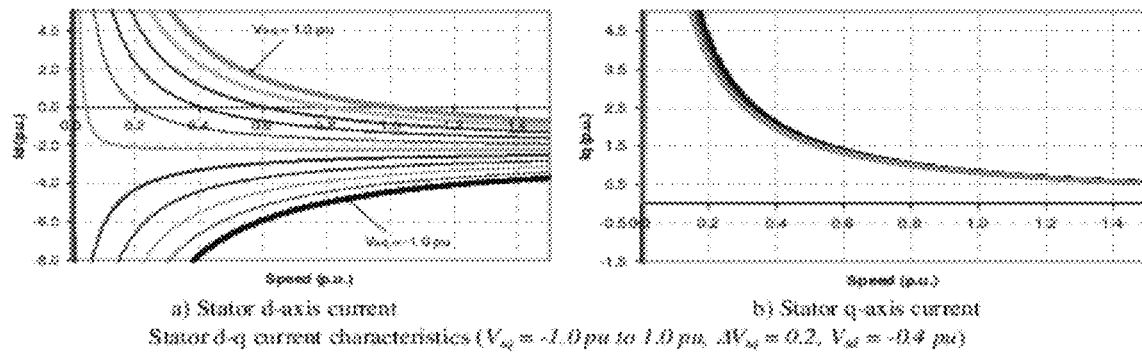
FIGS. 5A and 5B illustrate stator d-q current characteristics ($V_{sq}$=−1.0 pu to 1.0 pu, $\Delta V_{sq}$=0.2, $V_{sd}$=−0.4 pu)

Unlike $V_{sd}$ control, the control of $V_{sq}$ affects the stator current characteristics differently. FIGS. 5A and 5B display typical stator d-axis and q-axis current characteristics as the $V_{sq}$ changes from −1.0 p.u. to 1.0 p.u. while $V_{sd}$ is fixed at −0.4 p.u. The following properties are obtained from the simulation study: (1) the stator d-axis current is clearly affected by $V_{sq}$ (FIG. 5a), showing that it is possible to control $I_{sd}$ by adjusting $V_{sq}$ for stator reactive power (Eq. (7)) or other control purposes; (2) under a constant generator speed, the stator d-axis current could be positive, negative, or zero. Thus, for a required torque, it is possible to regulate the stator d-axis current to zero by adjusting $V_{sq}$ if the generator speed is low, which could enhance the PMSG efficiency; and (3) the stator q-axis current characteristics almost maintain unchanged as $V_{sq}$ varies (FIG. 5B), implying that the stator q-axis current cannot be controlled through $V_{sq}$, which is consistent with Eq. (9).

PMSG Conventional Control Mechanism

A conventional control approach of a PMSG has a nested-loop structure, as shown by FIG. 2, comprising an inner current loop and an outer speed/torque and/or reactive power loops. The speed/torque loop outputs a q-axis current reference $i_{sq}^*$ depending on the difference between a desired speed and an actual generator speed. The inner current loop assures that the q-component of the measured current reaches the q-axis current reference $i_{sq}^*$ and the d-component of the measured current reaches a d-axis current reference $i_{sd}^*$. Therefore, the effectiveness of the PMSG torque and/or reactive power control depends on the d and q current-loop controllers.

a. Conventional Current-Loop Control Design

Figure 6:
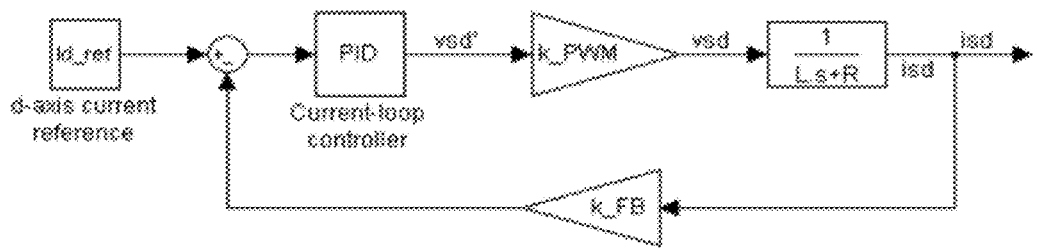
FIG. 6 illustrates an exemplary system block diagram for design of current-loop controller.

The strategy of the conventional decoupled d and q current-loop controllers can be obtained by rewriting Eq. (3) as $$v_{sd} = -\left(R_s i_{sd} + L_d \frac{di_{sd}}{dt}\right) - \omega_e L_q i_{sq} \quad (12)$$

$$v_{sq} = -\left(R_s i_{sq} + L_q \frac{di_{sq}}{dt}\right) + \omega_e L_d i_{sd} + \omega_e \psi_f \quad (13)$$

in which the item in the bracket of Eqs. (12) and (13) is treated as the state equation between the voltage and current on d and q loops, and the other items are treated as compensation or disturbance items. Hence, the controller design of traditional approaches is based on the system block diagram as shown by FIG. 6, in which the block labeled 1/(L·s+R) represents plant transfer function for d or q current loop, the block labeled $k_{PWM}$ is the gain of the power electronic converter (FIG. 4), block labeled $k_{FB}$ is a gain on the feedback path such as a gain from a sensor, and the block labeled PID stands for the controller to be designed.

Figure 7:
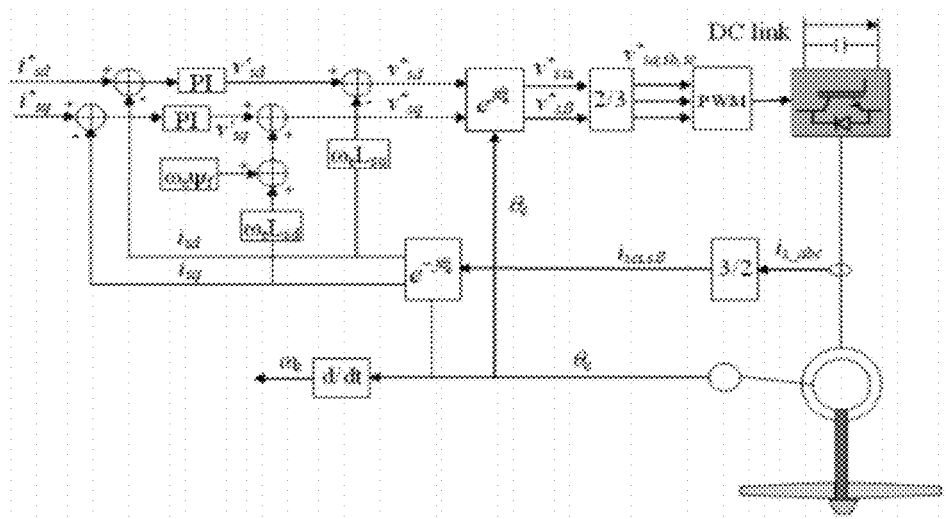
FIG. 7 illustrates a conventional PMSG decoupled d-q vector control structure.

FIG. 7 shows the overall structure of the conventional PMSG d-q vector control mechanism after the compensation items (see, e.g., Eqs. (12)-(13), are included. In such figure, the d and q reference voltages $v_{sd}^*$ and $v_{sq}^*$, are the d and q voltages $v_{sd}'$ and $v_{sq}'$ from the controllers plus the compensation items; see Eqs. (14) and (15). Therefore, this control configuration intends to control the stator d-axis and q-axis currents through the decoupled d and q voltages, $v_{sd}'$ and $v_{sq}'$, respectively. Yet, as described herein, d-axis voltage is primarily (and, in certain scenarios, exclusively) effective for stator q-axis current control, and q-axis voltage is primarily (and, in certain scenarios, exclusively) supportive of stator d-axis current control, indicating that there is an inherent theoretical deficiency in the traditional d-q control technology. Although there are compensation items in both d and q current loops, they are not contributed in a feedback control principle and concept.

$$v_{sd}^* = v_{sd}' - \omega_e L_q i_{sq} \quad (14)$$

$$v_{sq}^* = v_{sq}' + \omega_e L_d i_{sd} + \omega_e \psi_f \quad (15)$$

b. Control Evaluation Using Average Converter Model

Figure 8:
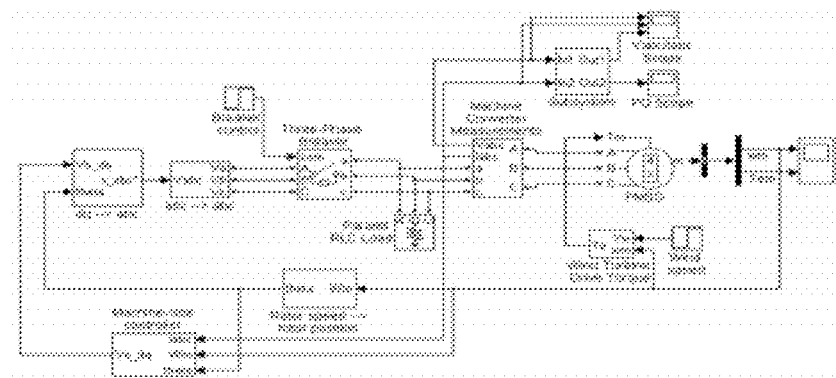
FIG. 8 is an illustration of a PMSG control simulation using converter average model.

The current-loop control structure of FIG. 7 can be built by using simulation software such as SimPowerSystems™ (Mathworks, Inc., Natick, Mass.), as illustrated in FIG. 8. The wind turbine driving torque is computed based on wind speed and turbine rotational speed. The voltage applied to the PMSG stator is represented by a three-phase controlled voltage source that is regulated by $V_{sd}^*$ and $V_{sq}^*$ using the converter average model. In addition, the converter must operate within its linear modulation boundary, determined, for example, by $$\sqrt{\frac{V_{sd}^2 + V_{sq}^2}{3}} \leq \frac{V_{dc}}{2\sqrt{2}} \quad (16)$$

where $V_{dc}$ is the DC-link voltage. The PMSG data is the same as those used in the steady-state analysis except that the wind turbine inertia is included. Major measurements can comprise speed, torque, and three-phase voltage, current, and stator real and reactive power. For the power measurement, active sign convention is used, e.g., power generated by the generator toward the machine-side converter is positive.

Figures 9A, 9B, 9C:
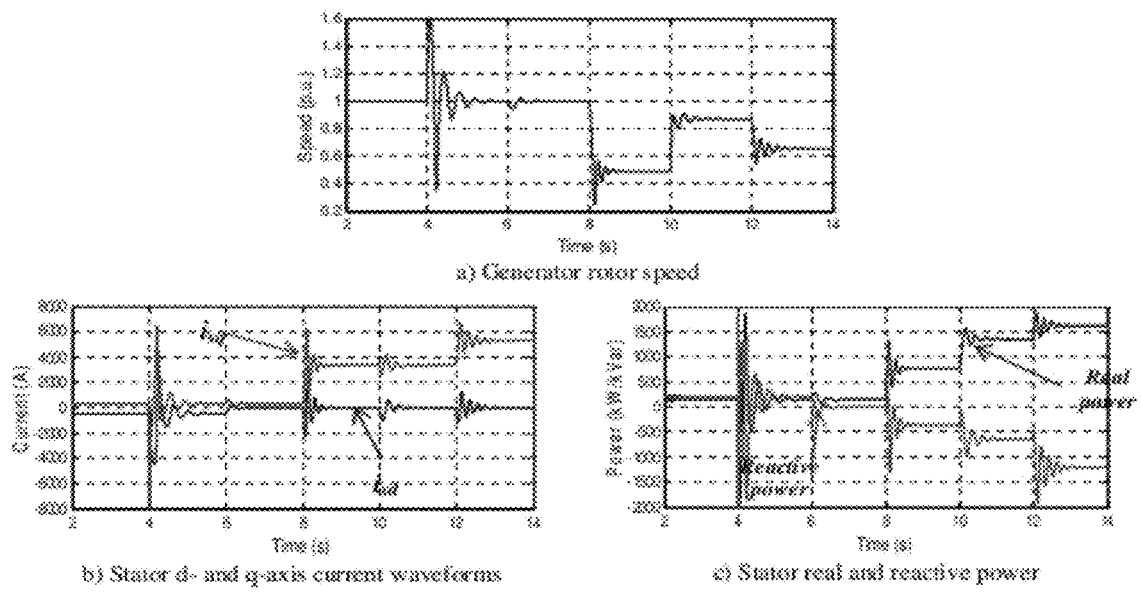
FIGS. 9A, 9B and 9C illustrate performance of conventional PMSG current-loop controller within the converter linear modulation limit.

The performance of the conventional control approach is evaluated for the PMSG system (as specified, for example, in Table 1) having different pole pairs. The DC link voltage is 1000V. FIGS. 9A, 9B and 9C present the performance of the controller for the direct driven PMSG having 150 pole pairs. The rotor diameter of the turbine blades is 100 m, the air density is 1.17 kg/m³ and the initial wind speed is 7 m/s. Before t=4 s, the system operates in an open-loop condition for a pre-specified stator d-q control voltage. Under the open-loop control condition, both d and q currents are not controlled. Thus, the PMSG system takes a significant time to achieve a natural stable state. At t=4 ms, the current-loop controllers are added with a current reference of $i_{sd}^*=-480$ A and $i_{sq}^*=305$ A, which are the stator d and q currents before the current-loop controllers begin to operate. As gleaned from FIG. 9A, the PMSG speed fluctuates greatly before it is stabilized using the conventional control approach. At t=6 s, $i_{sd}^*$ changes to 0 A while $i_{sq}^*$ remains unchanged, e.g., a minimum stator current control strategy. The system first oscillates for certain period and then becomes stable at the new current reference. The speed and the stator real power are almost unchanged (FIGS. 9a and 9c), demonstrating that the torque, speed, and stator real power depend primarily on the q-axis current control (consistent with Eq. (9)). At t=8 s, $i_{sq}^*$ changes to 3350 A, which can represent a required q-axis current for PMSG maximum wind power extraction at the wind speed of 7 m/s. With such current reference, the stator q-axis current increases causing the electromagnetic torque to increase and the generator speed to decrease toward the maximum power extraction speed point (see FIG. 9A). At t=10 s, the wind speed changes from 7 m/s to 9 m/s, causing the wind turbine driving torque larger than the electromagnetic torque and the generator speed to increase (see FIG. 9A). At t=12 s, $i_{sq}^*$ changes to 5300 A, which can represent a reference q-axis current for maximum power extraction at the wind speed of 9 m/s. In response, the generator speed decreases until a new speed point for maximum power extraction is reached (see FIG. 9A). As it can be seen from FIGS. 9A, 9B and 9C, for each system condition change, utilization of the conventional control approach results in large oscillation in the magnitude of the controlled quantities.

Figures 10A, 10B, 10C:
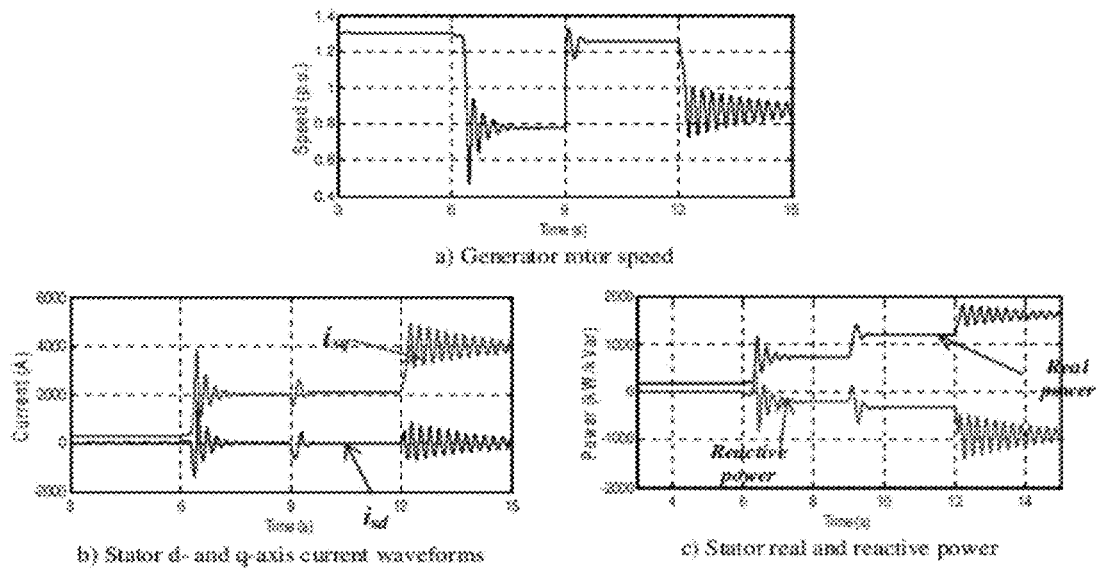
FIGS. 10A, 10B and 10C illustrate performance of conventional PMSG current-loop controller with $|v_{s\_dq}*|$ exceeding the linear modulation limit at some conditions.

The q-axis current for maximum power extraction as shown in FIG. 9B is high. In one aspect, to reduce stator q-axis current, the number of PMSG pole pairs can be increased. For a maximum power extraction demand at the same turbine rotational speed, the generator speed is higher and the stator q-axis current is lower if a PMSG has a larger number of pole pairs. However, zero stator d-axis current may be unable to obtain at a higher generator rotating speed due to the converter linear modulation constraint. Traditionally, as the controller output voltage $|v_{s\_dq}^*|$ exceeds the linear modulation limit, a saturation function is applied to $|v_{s\_dq}^*|$ while the phase $\angle v_{s\_dq}^*$ is kept unchanged. FIGS. 10A, 10B and 10C show the performance of the conventional control approach for as PMSG system (such as specified, for example, in Table 1) having 200 pole pairs. The initial wind speed is 7 m/s. Before t=6 s, $i_{sd}^*=0$ A and $i_{sq}^*=237$ A, a current reference that causes $|v_{s\_dq}^*|$ exceeding the linear modulation and the stator rated voltage limit due to a high generator rotating speed. As such, the actual stator q and/or d current are unable to be regulated to the desired values. At t=6 s, $i_{sq}^*$ changes to 2450 A, which can represent a required q-axis current for maximum power extraction at the wind speed of 7 m/s. The new current reference causes the generator speed to decrease and $|v_{s\_dq}^*|$ to drop below the linear modulation limit. Yet, the results show that the conventional control approach is in an improper operation state since the first time $|v_{s\_dq}^*|$ exceeds the linear modulation limit. Although $|v_{s\_dq}^*|$ is below the linear modulation limit after t=9 s, the traditional control technique, unable to cause the PMGS system to return to its normal operation mode, cannot adjust d-axis and q-axis currents to their references and, thus, the maximum power extraction objective cannot be assured effectively. At t=9 s, the wind speed changes to 9 m/s while the d-axis and q-axis current references remain unchanged, making $|v_{s\_dq}^*|$ over the linear modulation limit. At t=12 s, $i_{sq}^*$ changes to 4150 A for maximum wind power extraction control at the wind speed of 9 m/s. As described herein, the conventional control technique cannot cause the PMSG system to return to its normal state for the maximum power extraction control, and the stability and reliability of a PMSG system can be significantly affected under the variable and dynamic system conditions using the conventional control approach as illustrated in FIGS. 10A, 10B and 10C.

A Novel PMSG Decoupled d-q Vector Control Design

The theoretical foundation of a novel control technology, and related embodiments described herein, is found in equations (7) and (8), e.g., utilizing q-axis current for torque control and d-axis current for reactive power or other control purposes. In contrast to the traditional control strategy that generates a d-axis or q-axis voltage based on a d-axis or q-axis current error signal, the control mechanism of the subject disclosure, as implemented by embodiments of methods and systems described herein, outputs a current signal at the d or q loop of the controller. The d and q current signals $i_{sd}'$ and $i_{sq}'$ generated by the controllers are then used to compute d and q reference voltages $v_{sd}^*$ and $v_{sq}^*$ according to Eqs. (17) and (18), which is equivalent to the transient d-q equation (Eq. (3)) after being processed by a low pass filter for the purpose to reduce the high voltage oscillation applied directly to the converter.

$$v_{sd}^* = -R_s i_{sd}' - \omega_e L_q i_{sq}' \quad (17)$$

$$v_{sq}^* = -R_s i_{sq}' + \omega_e L_d i_{sd}' + \omega_e \psi_f \quad (18)$$

Figure 11:
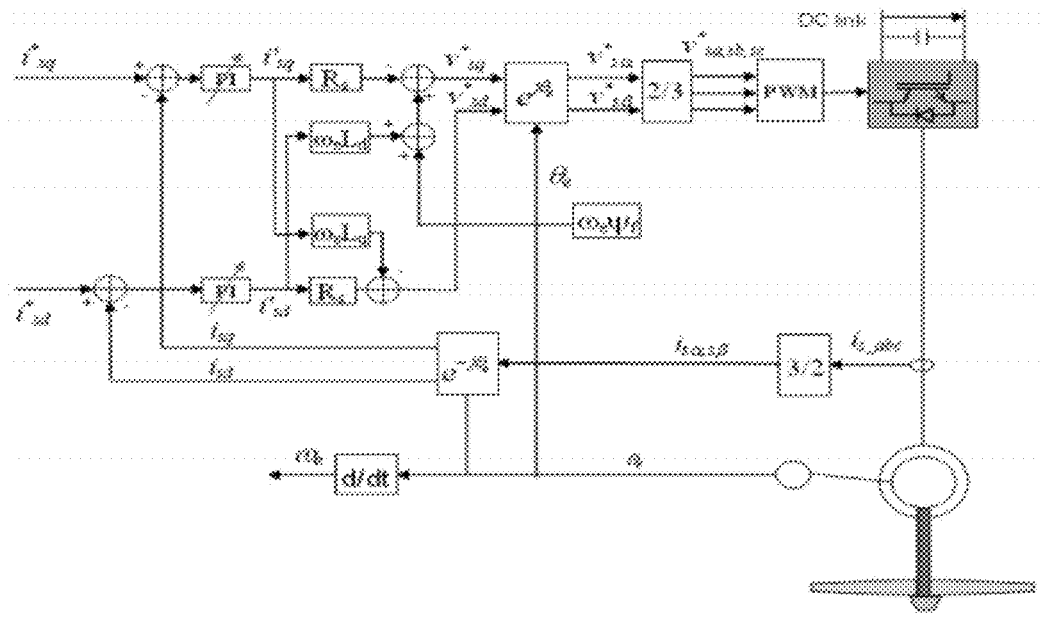
FIG. 11 illustrates an embodiment of direct-current based decoupled d-q vector control structure for PMSG wind turbines.

FIG. 11 displays a block diagram of a control unit and related configuration in accordance with aspects of the disclosure. The control unit can be utilized to control a PMSG wind turbine as described herein. The illustrated block diagram represents an embodiment of a direct-current based decoupled d-q vector control structure for PMSG wind turbines. FIG. 11 comprises a q-axis current loop for torque control and a d-axis current loop for reactive power control or other control purposes. Signal processing technology is applied to the measured d and q currents after the transformation of stator current from three-phase a-b-c to d-q domain to prevent the high order harmonics of the d and q currents from entering the controllers. The controller operates on a mechanism that combines PID, fuzzy and adaptive control technologies. The PID parts of the current controller operate on a direct target control principle. The fuzzy and adaptive parts of the controllers adjust the PID parameters based on information such as the difference between the measured and reference target values.

In addition, a nonlinear programming formulation described herein is developed to prevent the resultant d-q current from going over the converter rated current and to prevent the converter from getting into a nonlinear modulation mode. The basic principle of the nonlinear programming formulation is that under the converter rated power and linear modulation constraints, the PMSG system should operate to meet the q-axis current or torque/speed control target while minimize the difference between the reference and actual d-axis currents. It should be appreciated that this nonlinear programming strategy can be effective to implement using an embodiment of the proposed control structure (see FIG. 11). Yet, in conventional control structures (see, e.g., FIG. 7), the nonlinear programming strategy of the disclosure may cause instabilities.

In one aspect, the nonlinear programming strategy comprise the following action:
Minimize: $|i_{sd} - i_{sd}^*|$
Subject to: $i_{sq} = i_{sq}^*$ $$\sqrt{\frac{i_{sd}^2 + i_{sq}^2}{3}} \le I_{rated}, \sqrt{\frac{v_{sd}^2 + v_{sq}^2}{3}} \le \frac{V_{dc}}{2\sqrt{2}}$$

Figures 12A, 12B, 12C:
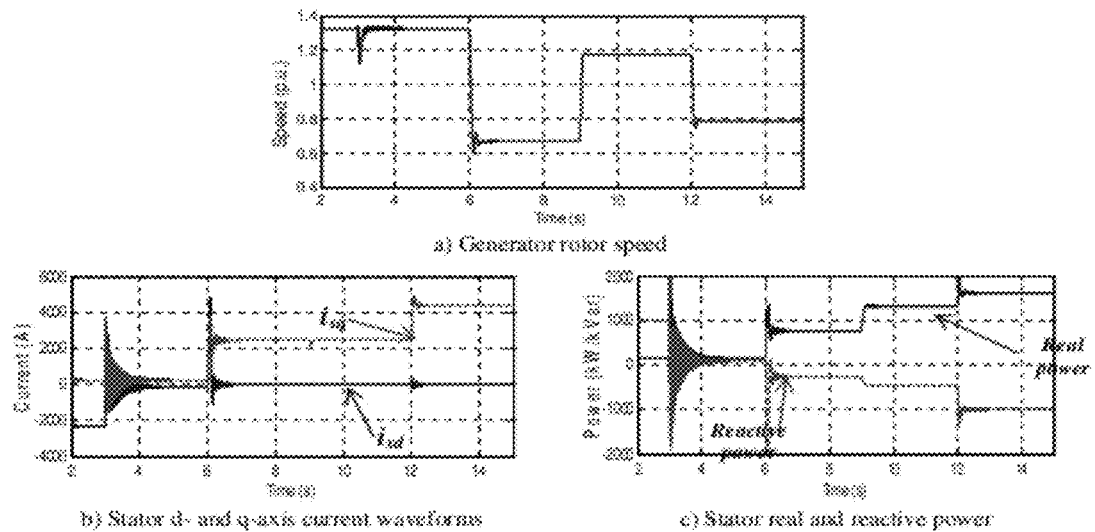
FIGS. 12A, 12B and 12C illustrate performance of an embodiment of a PMSG current-loop controller.

In one aspect, the control system of FIG. 11 can be built by using SimPowerSystems and the converter average model, which is similar to that in FIG. 8 except that the conventional control mechanism is replaced by the novel control design and related approach of the subject disclosure. FIGS. 12A, 12B, and 12C demonstrate the performance of the novel control approach for the same condition used in FIGS. 10A, 10B and 10C. Before t=3 s, the system operates in the same open-loop condition as that used in FIGS. 10A, 10B and 10C. At t=3 ms, when the current-loop controllers are introduced, the novel control technique shifts the system from open-loop to close-loop condition with much less system oscillation (see FIGS. 10A-10C and FIGS. 12A-12C). Although the current reference causes $|v_{s\_dq}^*|$ exceeding the converter linear modulation limit, the novel control design operates the system in the optimal control mode by minimizing the difference between $i_{sd}$ and $i_{sd}^*$ while maintaining the torque and speed control effectiveness (FIG. 12B). At t=6 s, as $i_{sq}^*$ changes to 2450 A for maximum power extraction at wind speed of 7 m/s, the proposed control design quickly drags the controller out of the nonlinear modulation mode and regulate $i_{sd}$ and $i_{sq}$ to the new reference values. For any condition changes, such as a wind speed change from 7 m/s to 9 m/s at t=9 s and a control reference change at t=12 s, the novel control mechanism demonstrates much better performance in various aspects than the conventional control approach.

Control Evaluation in Switching Environment

Figure 13:
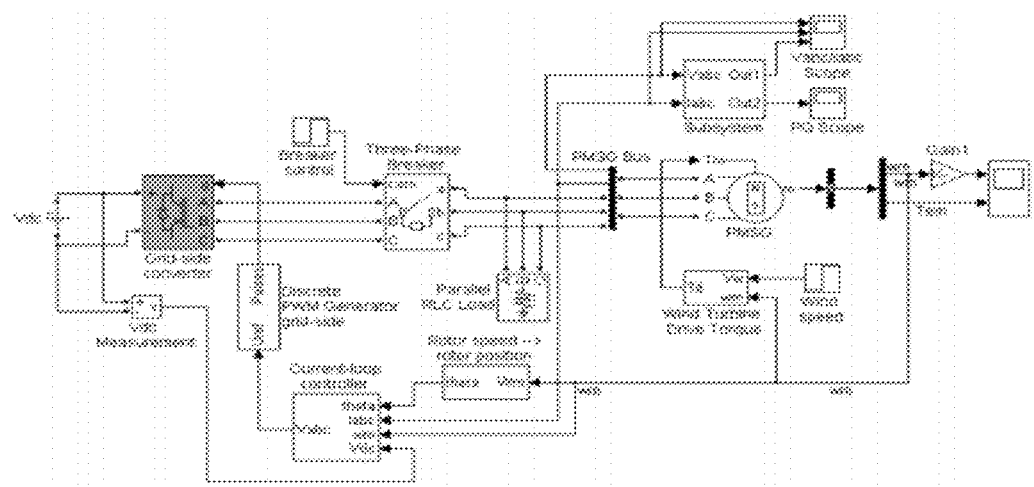
FIG. 13 illustrates an embodiment of a PMSG system using converter switching model.
Figures 14A, 14B:
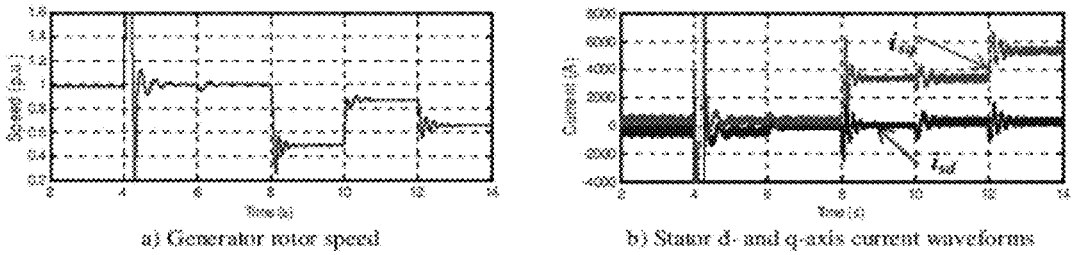
FIGS. 14A and 14B illustrate performance of traditional PMSG control in switching condition.
Figures 15A, 15B:
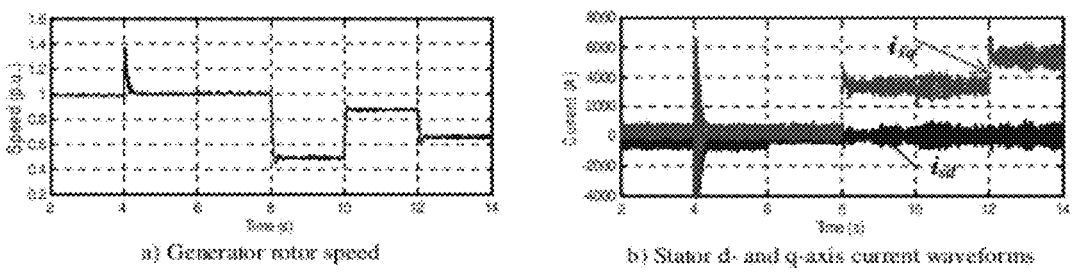
FIGS. 15A and 15B illustrate performance of an embodiment of a PMSG direct-current based control in switching condition.

The power electronic converter of a PMSG system switches on and off continuously. Hence, performance of a PMSG system must be validated in a practical transient switching environment. FIG. 13 displays the configuration of a PMSG system using a detailed switching model for the power converter. In one aspect, the switching mode can be obtained from the SimPowerSystems library. The output voltage from the controller is applied to a three-phase DC/AC PWM converter. The converter switching frequency is 1800 Hz. It should be appreciated that other frequencies can be utilized. This configuration can emulate an actual, deployed PMSG system under power converter control more closely. FIGS. 14A-14B and FIGS. 15A-15B present PMSG performance, contrasting performance attained through conventional control techniques and the control techniques of the disclosure, respectively, for the same control transitions used in FIGS. 9A, 9B and 9C. Compared to FIGS. 9A, 9B and 9C, there are evident oscillations in instantaneous d-q current and real/reactive power waveforms due to the switching effect (see FIGS. 14B and 15B). Nevertheless, the generator rotational speed is similar using both the switching and average models (FIGS. 14A and 15A). In addition, it demonstrates again, in the switching condition, that the performance of the novel control design is much better than that of the conventional control mechanism.

Maximum Power Extraction Control of PMSG Wind Turbine

Characteristics of one embodiment of the present methods and systems related to maximum wind power extraction control can comprise: (1) a virtual lookup table approach; (2) dynamic and smart formation of the virtual lookup table; (3) a nested speed and current loop control structure that can quickly fulfill the maximum power extraction control objective using an intelligent mechanism that is different from conventional intelligent approaches; and (4) an implementation of the maximum power extraction control in the direct-current based d-q vector control environment. Though in certain embodiments the speed control loop and the direct-current based d-q vector control can be omitted, they are generally included for quick response.

a. Speed Control Design at Wind Turbine Level

One of the purposes of the speed controller is to achieve PMSG maximum power extraction at a reference speed point. For a desired rotating speed, the controller generates a torque reference $\tau_{em}^*$ based on the error signal between the desired and the actual turbine rotating speeds. Then, under the assumption of $L_d = L_q$, the stator q-axis current reference can be estimated by $$i_{sq}^* = \tau_{em}^* / (p\psi_f) \quad (19)$$

At the wind turbine level, using the generator convention, the rotational speed of the generator follows from $$\tau_w = J_{eq}\frac{d\omega_g}{dt} + B_a\omega_g + \tau_{em} \quad (20)$$

$$\omega_e = p \cdot \omega_g, \omega_g = n_{gear} \cdot \omega_m \quad (21)$$

Here, $\tau_W$ is the instantaneous turbine driving torque referred to the generator, $\tau_{em}$ is the instantaneous electromagnetic torque, $J_{eq}$ is the total equivalent inertia referred to the generator, $B_a$ is the active damping coefficient representing turbine rotational losses, and $\omega_g$ is the generator rotational speed. The relation among $\omega_e$, $\omega_g$, and the wind turbine rotational speed $\omega_m$ can be derived from Eq. (21) where p is the generator pole pair and $n_{gear}$ is the gear ratio from the high-to low-speed shaft of a wind turbine. If $n_{gear}=1$, it represents a direct driven PMSG system condition. In the steady state condition, the wind turbine driving torque or power must balance with the electro-magnetic torque or converted power if neglecting the rotational losses. In addition, a stable torque or power balance point requires that, for any small increase or decrease of the generator speed, a PMSG should return to the balance point effectively.

The mechanical power extracted by a wind turbine from the wind can be expressed by the cube law equation:

$$P_w = \frac{1}{2}\rho_{air}A_{blade}C_P(\beta, \lambda) \cdot v_w^3 \quad (22)$$

$$\lambda = R_{blade}\omega_m/v_w \quad (23)$$

where $\rho_{air}$ is the air density, $A_{blade}$ is the area covered by the rotor blades, $C_p$ is the turbine performance coefficient, $v_w$ is wind speed, and $R_{blade}$ is the radius of the rotor blades. The performance coefficient, $C_p$, is a function of the tip-speed-ratio $\lambda$ (Eq. (23)) and the pitch angle $\beta$ of the rotor blades. The mathematical representation of $C_p$ curves for a variable-speed wind turbine is obtained through curve fitting as shown by Eq. (24) where $a_{ij}$ coefficients are available in the literature (see, e.g., Nicholas W. Miller, William W. Price, and Juan J. Sanchez-Gasca, "Dynamic Modeling of GE 1.5 and 3.6 Wind Turbine-Generators," Version 3.0, Technical Report, GE Power Systems Energy Consulting, Schenectady, N.Y., Oct. 27, 2003, which is incorporated herein by reference). For a given wind speed and a pitch angle, there is an optimal tip-speed-ratio $\lambda_{opt}$ and an optimal turbine rotating speed $\omega_{m\_opt}$ under which $C_p$ takes a maximum value, e.g., maximum power extraction from the wind for that pitch angle.

$$C_P(\beta, \lambda) = \sum_{i=0}^{4}\sum_{j=0}^{4} a_{ij}\beta^j\lambda^i \quad (24)$$

Therefore, the plant transfer function of the speed loop, obtained from Eq. (20), is $$G_{SL}(s) = 1/(J_{eq} \cdot s + B_a) \quad (25)$$

Figure 16:
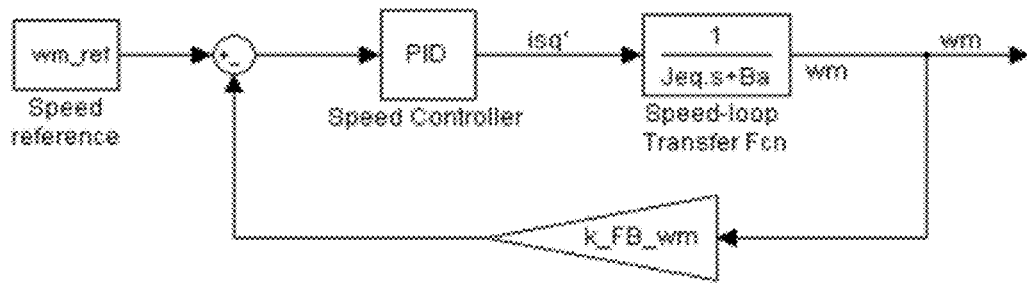
FIG. 16 illustrates a system block diagram for design of speed-loop controller.

Hence, a close-loop block diagram, as shown by FIG. 16, is obtained and the speed-loop controller is designed based on Eq. (25). The block labeled PID represents a controller.

Figure 17:
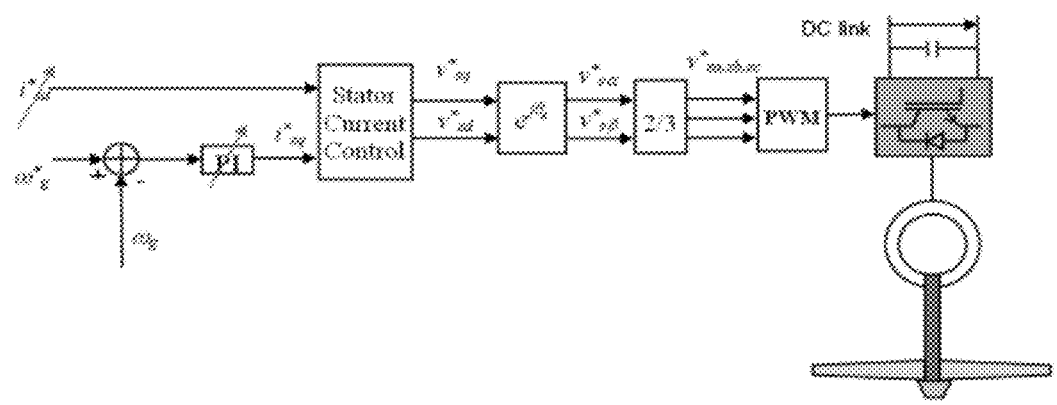
FIG. 17 illustrates a PMSG speed control diagram.

FIG. 17 presents one embodiment of an overall control structure. The speed reference is generated according to a maximum power extraction control strategy. The torque reference generated from the speed controller is transformed to PMSG stator q-axis current reference $i_{sq}^*$. The stator d-axis current reference is set to zero. However, if the converter exceeds its linear modulation limit, for example, the stator d-axis current is actually regulated according to the optimal control rule when using the peak power tracking control strategy.

b. Conventional Lookup Table Approach

The peak power tracking of a variable-speed wind turbine depends on the electrical, aerodynamic and maximum power extraction characteristics. In order for an effective and optimal design of a maximum power extraction approach for a variable-speed wind turbine, all of the three parts can be integrated together for a study. The extracted power and the maximum power extraction characteristics can be represented using the generator speed rather than the turbine rotational speed.

Figure 18A:
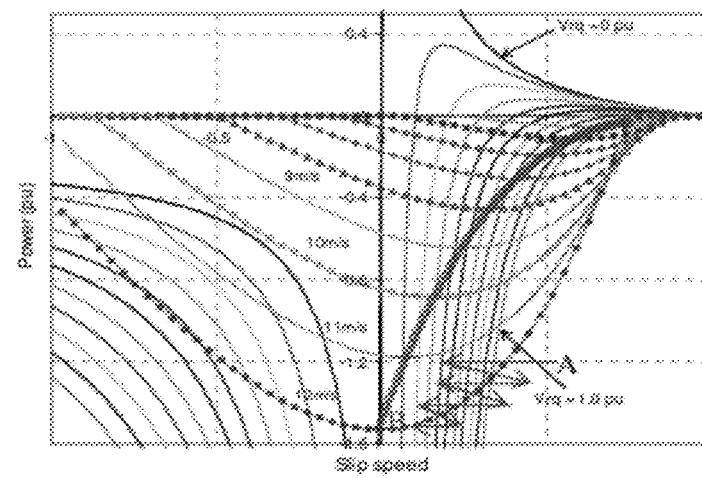
FIGS. 18A, 18B and 18C illustrate exemplary static curves used in peak power tracking control strategies.

The existing commercial peak power tracking control strategy used in a DFIG wind turbine, requiring no wind speed information, uses only wind turbine output power and maximum power extraction characteristics to generate a speed reference to DFIG speed-loop controller recursively until the maximum power extraction speed point is reached (FIG. 18A). For example, assuming that a DFIG operates initially at point A in FIG. 18A when the wind speed is 1 μm/s, then, based on the measured DFIG output power $P_{grid}^{mea}$, a recursive process starts. 1) The peak power tracking approach generates a speed reference to the speed-loop controller based on the P-ω curve. 2) The controller can respond the reference change by increasing the generator speed, which causes more power output. 3) The peak power tracking approach generates a new speed reference due to the output power increase. The process continues until the peak power point B is reached.

Figure 18B:
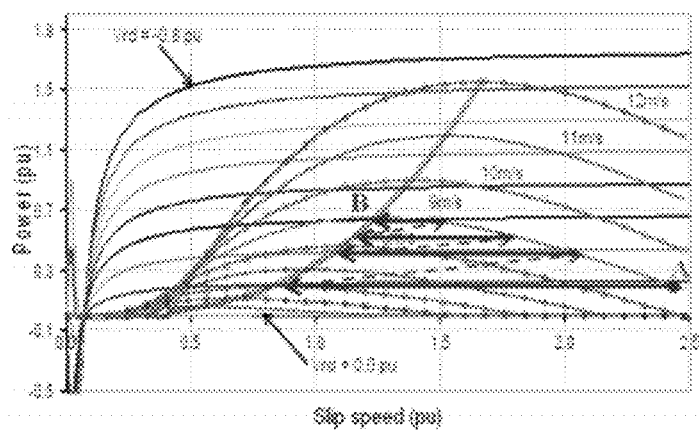

However, this peak power tracking control strategy does not fit PMSG generator characteristics. As it can be seen from FIG. 18B, there is a contradiction between the stable operating speeds required by a PMSG wind turbine and the speed references generated from the P-ω curve. According to the generator converted power and the extracted wind power characteristics, the intersection corresponding to the higher speed point on the right side of FIG. 18B is dynamically stable. Nevertheless, the speed references generated from the P-ω curve have a tendency to bring a PMSG into an instable operating mode. It is found that, in a transient feedback control environment, the conventional P-ω lookup table approach suitable to a DFIG wind turbine could result in significant oscillations and instability of a PMSG wind turbine.

c. Intelligent Maximum Wind Power Extraction Control

Embodiments of the present methods and systems can combine the conventional lookup table approach with a smart speed finding approach to identify the reference generator rotating speed for the maximum wind power extraction.

Figure 18C:
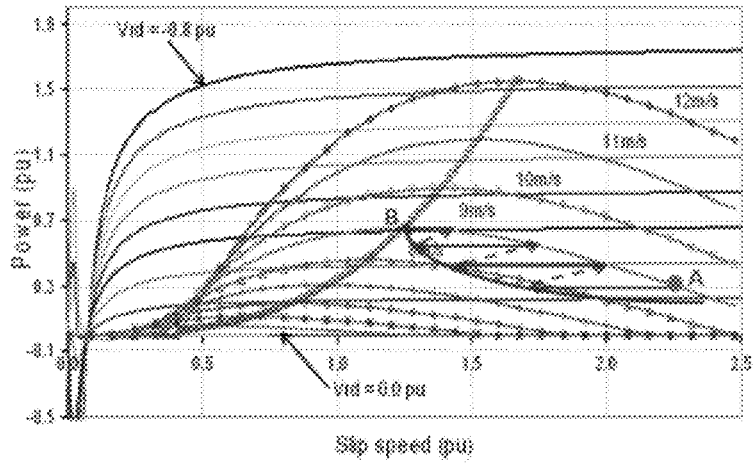

In the integrated characteristic environment, the embodiment of the present methods and systems for maximum wind power extraction represents a concept of generating a dynamic and virtual P-ω lookup table (FIG. 18C). However, unlike the conventional lookup table approach, the proposed approach incorporates not only wind turbine output power but also generator rotating speed. Features of the techniques of the disclosure for intelligent wind power extraction include:

1) A virtual lookup table. The speed reference generated from the proposed approach involves two steps. First, for each measured turbine output power, generate a speed reference from the conventional P-ω curve. Second, adjust the speed reference by considering the difference between the generator rotating speed and the speed reference obtained from the P-ω curve so that the updated speed reference to PMSG speed-loop controller can yield stable operation of the generator.

2) Dynamic formation of the virtual lookup table. Unlike the traditional fixed P-ω curve, the virtual P-ω lookup table has different dynamic traces for transition from different PMSG operating points toward a maximum power extraction speed point.

3) Application of fuzzy and adaptive rules. To permit fast response for a PMSG system transition toward a maximum power extraction speed point and stable operation of the generator, an adaptive strategy is designed to generate the virtual lookup table through a fuzzy logic mechanism. The fuzzy logic approach is designed by using information such as difference between the generator speed and speed reference generated by the traditional P-ω curve and dynamic performance of the system.

The mathematical description of the PMSG peak power tracking control can be described below using the virtual lookup table concept, where k, representing the sampling interval of a peak power tracking approach, can be different from that used in speed-loop and current-loop digital controllers.

a) In one aspect, for a given wind speed, obtain turbine output power at $t=t_0$: $P_{out}(t_k)|_{k=0}$ b) In another aspect, using the virtual P-ω curve, generate a speed reference based on the information of turbine output power and generator speed: $\omega_g^*(t_k) = P_\omega^{-1}(P_{out}(t_k), \omega_g(t_k))$ c) In response to steps a) and b), the PMSG system or functional elements thereof can perform the following actions:

Speed-loop controller generates d and q current references based on speed and reactive power demands: $[i_{sd}^*(t_k), i_{sq}^*(t_k)] = f_i(\omega_g^*(t_k), Q^*(t_k))$ Current-loop controller generates d and q control voltages to the machine-side converter based on d and q current demands: $[v_{sd}^*(t_k), v_{sq}^*(t_k)] = f_v(i_{sd}^*(t_k), i_{sq}^*(t_k))$.

PMSG system updates the power extracted from the wind based on the control voltage applied to the machine-side converter and the generator rotating speed: $P_{out}(t) = f_p(v_{sd}^*(t_k), v_{sq}^*(t_k), \omega_g(t))$ d) In another aspect, update turbine output power which is processed by a low-pass filter at $t=t_{k+1}$:

$$P_{out}(t_{k+1}) = f_{low\_pass}(P_{out}(t))|_{t=t_{k+1}}$$

e) In another aspect, reiterate step b).

Figure 19:
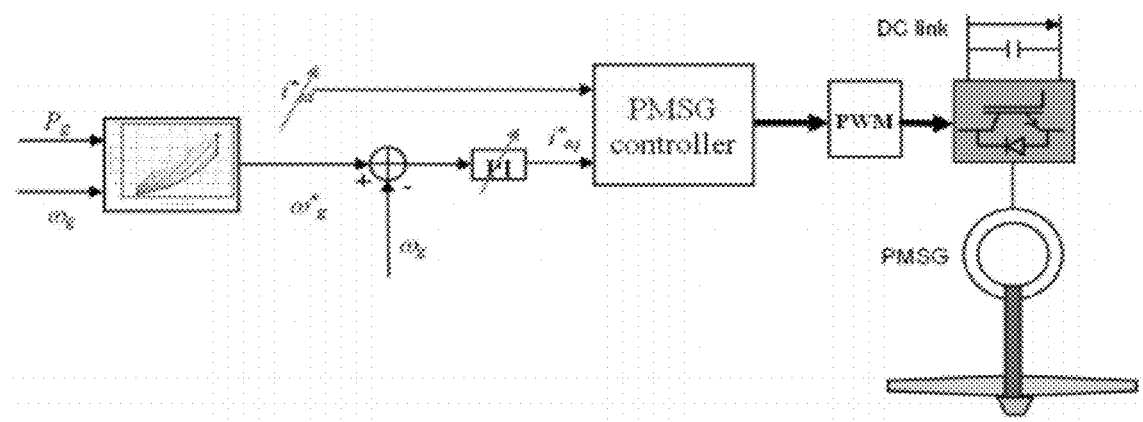
FIG. 19 illustrates generation of a speed reference for peak power tracking control.
Figure 20:
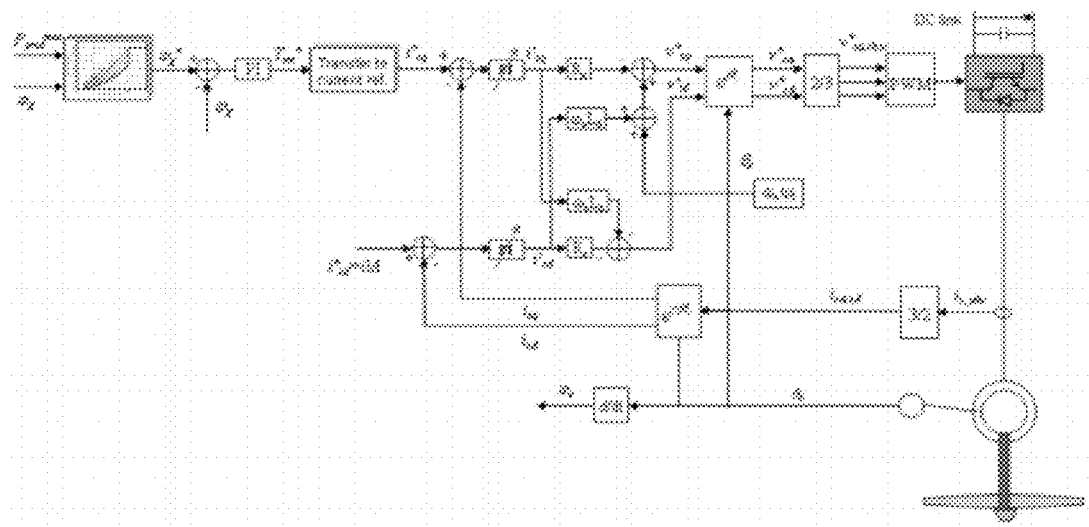
FIG. 20 illustrates a partial block diagram of an embodiment for the maximum wind power extraction.

As illustrated in FIG. 20, an embodiment of the overall control structure can be built by using SimPowerSystems, which is similar to FIG. 8 and FIG. 13, except that a speed control loop is added to generate the stator q-axis current reference and the speed reference is generated through the maximum power extraction mechanism. The inputs to the peak power tracking block include PMSG output power and generator rotating speed, and the output of the block is a speed reference that is generated from the virtual P-ω curve as shown by FIG. 7. FIG. 19 illustrates an exemplary embodiment of a system that can generate the speed reference for power tracking control. Based on the speed reference from the virtual P-ω curve, the speed-loop controller outputs a torque reference $\tau_{em}^*$ depending on the error signal between the desired and the actual turbine rotating speeds. Then, the stator q-axis current reference is estimated and the stator d-axis current is set to zero (e.g., a minimum stator current control scheme).

Figure 21A:
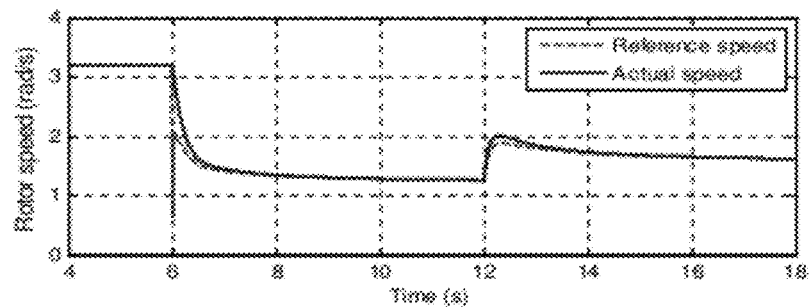
FIGS. 21A, 21B, 21C and 21D illustrate PMSG maximum power extraction control using power converter average model.
Figure 21B:
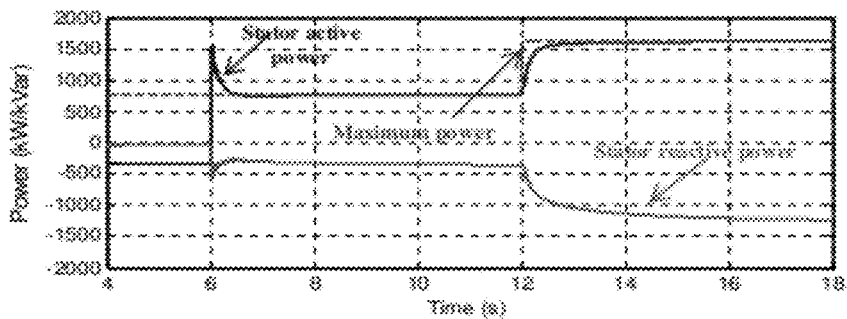
Figure 21C:
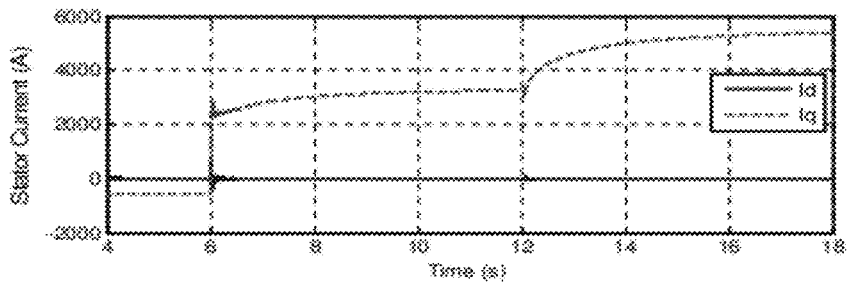
Figure 21D:
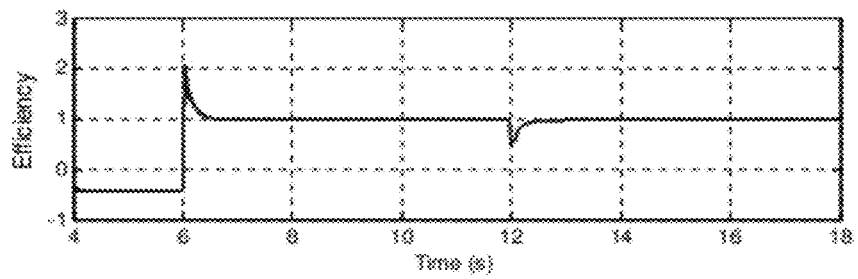

Peak Power Tracking Control Evaluation in Transient Close-Loop Environment a. Evaluation Using Converter Average Model FIGS. 21A-D present results for an exemplary scenario of PMSG peak power tracking control under steady wind speed conditions. The stator d-axis current reference is 0 A. Other conditions are the same as those used in FIG. 18C. Before t=4 s, the wind speed is 7 m/s and the reference generator speed is 3.2 rad/s, which is higher than the required speed for maximum power extraction at this wind speed. As it is shown by FIG. 21A, the generator rotor speed, after the system is stable, is maintained at the reference speed effectively using the direct-current based vector control technology. At t=6 s, the peak power tracking mechanism is applied, which initiates a recursive process as shown by FIG. 18C. Since the initial generator speed is far away from the maximum power speed point, the speed reference generated by the recursive peak power tracking algorithm changes sharply, causing oscillations of stator current and turbine output power and more oscillation of the speed reference generated by the virtual peak power tracking algorithm (FIG. 18C). However, due to the large inertia of the wind turbine, the actual generator speed does not oscillate much. After several recursive processes, both turbine and the reference speeds get close to each other toward to the maximum power extraction speed point. The efficiency of the wind turbine is more than 98% when the system is stable (FIG. 21C), demonstrating superior performance of the virtual lookup table approach for maximum wind energy extraction using a PMSG wind turbine. At t=12 s, wind speed changes from 7 m/s to 9 m/s. But, since the generator operates on the maximum power extraction characteristics before the wind speed change, the speed reference generated by the virtual peak power tracking algorithm causes much smaller oscillation, which is consistent with FIG. 18C. Therefore, generator speed, PMSG stator current and turbine output power shift smoothly toward to the new maximum power extraction point. All the transient results, after the system is stable for the maximum power extraction control, are consistent with steady-state results that can be calculated from PMSG steady-state analytical approach (FIG. 18C), showing that the recursive virtual peak power tracking control obtained from the integrative characteristic study agrees with the transient peak power tracking results.

b. Peak Power Tracking Evaluation in Switching Environment

Figure 22A:
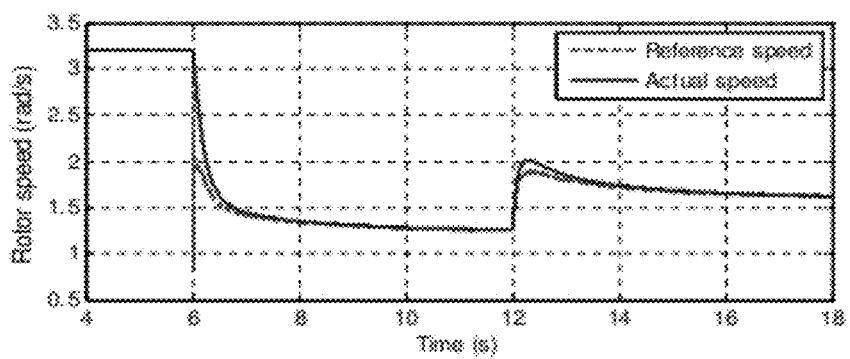
FIGS. 22A and 22B illustrate PMSG maximum power extraction control using power converter switching model.
Figure 22B:
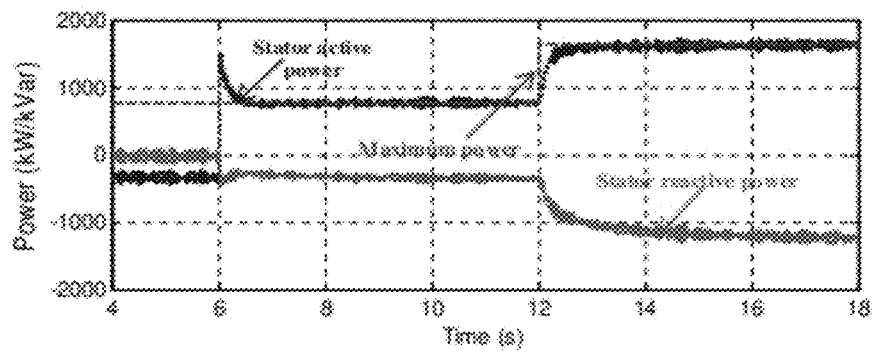

The power electronic converter of a PMSG system switches on and off continuously. Hence, performance of a PMSG system should be validated in a more practical transient switching environment. FIG. 22 presents PMSG performance using the virtual lookup table approach in the direct-current vector control configuration for the same control demands used in FIG. 21. Compared to FIG. 21, oscillations in instantaneous active/reactive power waveforms are present due to high frequency, ON-OFF switching of the power electronic converter (see, e.g., FIG. 22B). In one aspect, the generator rotational speed is very close using both the switching and average models (FIGS. 21A and 22A) and the wind turbine efficiency is similar to FIG. 21D, indicating the effectiveness of the peak power tracking control study obtained by using both power converter average and switching models.

c. Maximum Power Extraction Evaluation Under Variable and Gust Wind

FIG. 23 shows the performance of the smart virtual lookup table peak power tracking mechanism under a variable wind condition. Before t=10 ms, the wind speed is 8 m/s. At t=10 ms, variable and gust wind is applied, which results in variable and short-term gust wind as shown by FIG. 23A). Under the variable and gust wind condition, the maximum available power that can be extracted by the wind turbine fluctuates sharply as the wind speed varies. However, the turbine rotating speed, the net output power, and the generator electromagnetic torque shift smoothly under the virtual lookup table peak power tracking strategy. The net output power of the wind turbine follows the maximum available power properly while the influence of the gust wind is restrained as shown by FIG. 23C), demonstrating the effectiveness and stability of the peak power tracking mechanism in variable and gust wind conditions. The stator d-axis current is properly maintained near 0 A, showing that the stator current is maintained at lowest possible values to enhance the efficiency of a PMSG wind turbine. Under the variable and gust wind condition, the instantaneous efficiency of the wind turbine could be either smaller or larger than 100% depending on the energy stored in or released from the PMSG rotor. Therefore, it is appropriate to evaluate the efficiency in terms of a time span $t_s$. FIG. 23E presents the efficiency calculated for $t_s$ of 2 s and 3 s, which illustrates that from average captured and generated power standpoint, the maximum power extraction efficiency of the PMSG wind turbine under the proposed strategy is above 90%. This result reveal the suitability and superior performance of the methods and systems of the disclosure for control under variable wind conditions.

$$\eta(t_0) = \int_{t_0-t_s}^{t_0} P_{out}(t)dt / \int_{t_0-t_s}^{t_0} P_{w\_max}(t)dt \qquad (26)$$

Computer or Computing Device

Figure 24A:
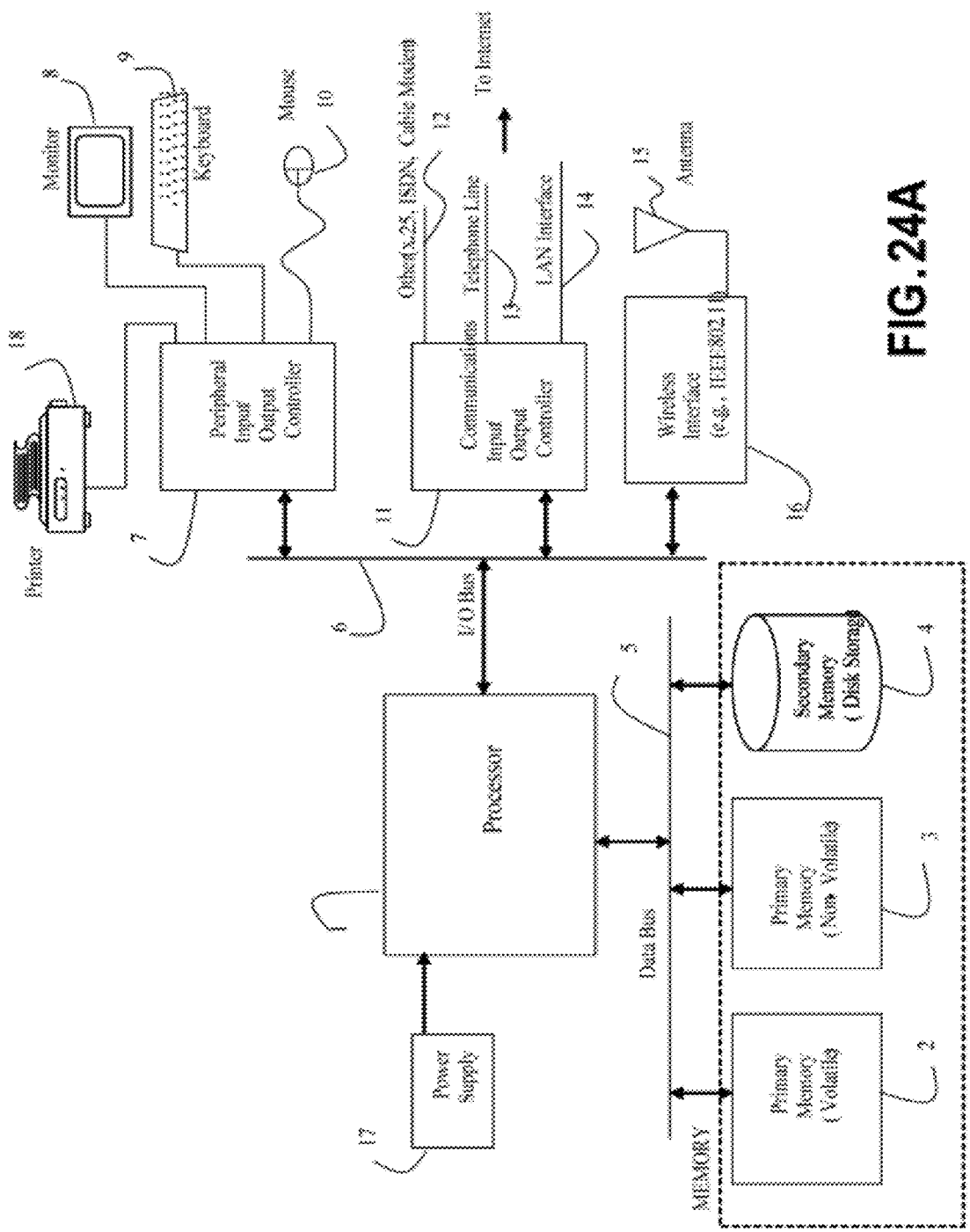
FIG. 24A is an exemplary computing device that can be used to practice aspects of the preferred embodiment.

In the preferred embodiments referenced herein, a "computer," "computing device," "controller," "server," "unit," or "controller" may be referenced such that steps of the control process may be performed by such computer and the control system can incorporate a computer or processor or a computer may be utilized in performing a simulation of the control systems and methods described herein. Such computer may be, for example, a mainframe, desktop, notebook or laptop, a hand held device such as a data acquisition and storage device, or it may be a processing device embodied within another apparatus such as, for example, a processor incorporated into telephonic system such as a private branch exchange (PBX) system or network devices having processors. In some instances the computer may be a "dumb" terminal used to access data or processors over a network such as the Internet. Turning to FIG. 24A, one embodiment of a computing device is illustrated that can be used to practice aspects of the preferred embodiment. In FIG. 24A, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1× EV-DO, GPRS, W-CDMA, or other protocol.

Figure 24B:
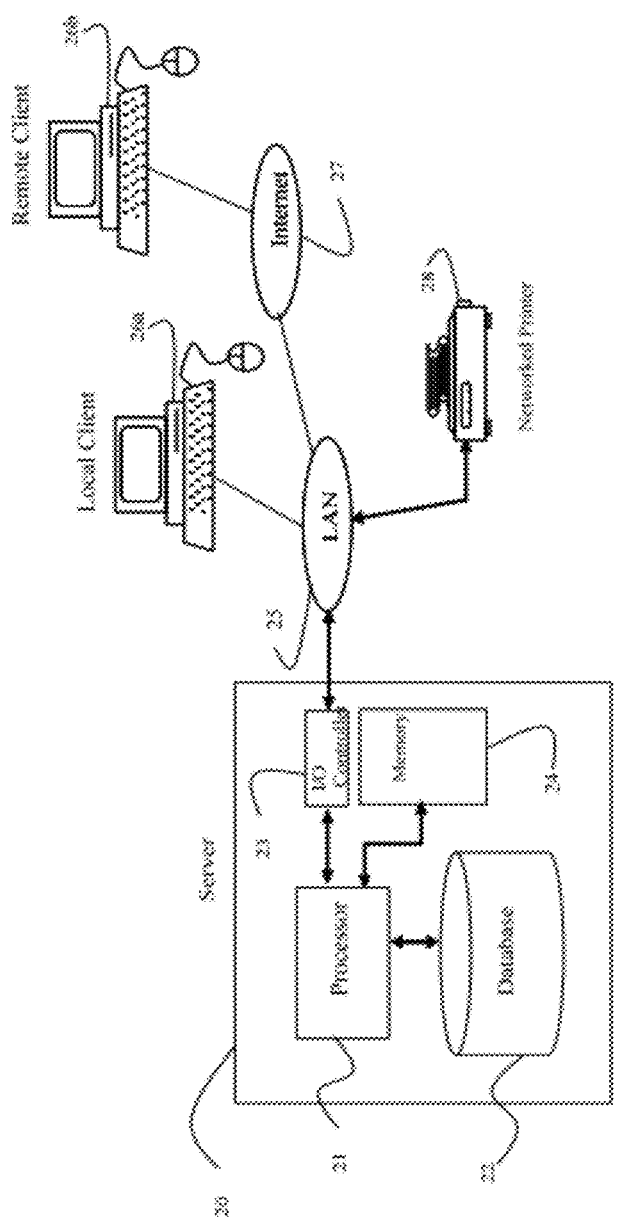
FIG. 24B is an alternative embodiment of a processing system of that shown in FIG. 24A that may be used in embodiments.

An alternative embodiment of a processing system that may be used is shown in FIG. 24B. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the wide area network 27, over the LAN 25, and to the server 20.

Those skilled in the art of data networking will realize that many other alternatives and architectures are possible and can be used to practice the preferred embodiments. The embodiments illustrated in FIGS. 24A and 24B can be modified in different ways and be within the scope of the present methods and systems as claimed.

EXAMPLES

Figure 1D:
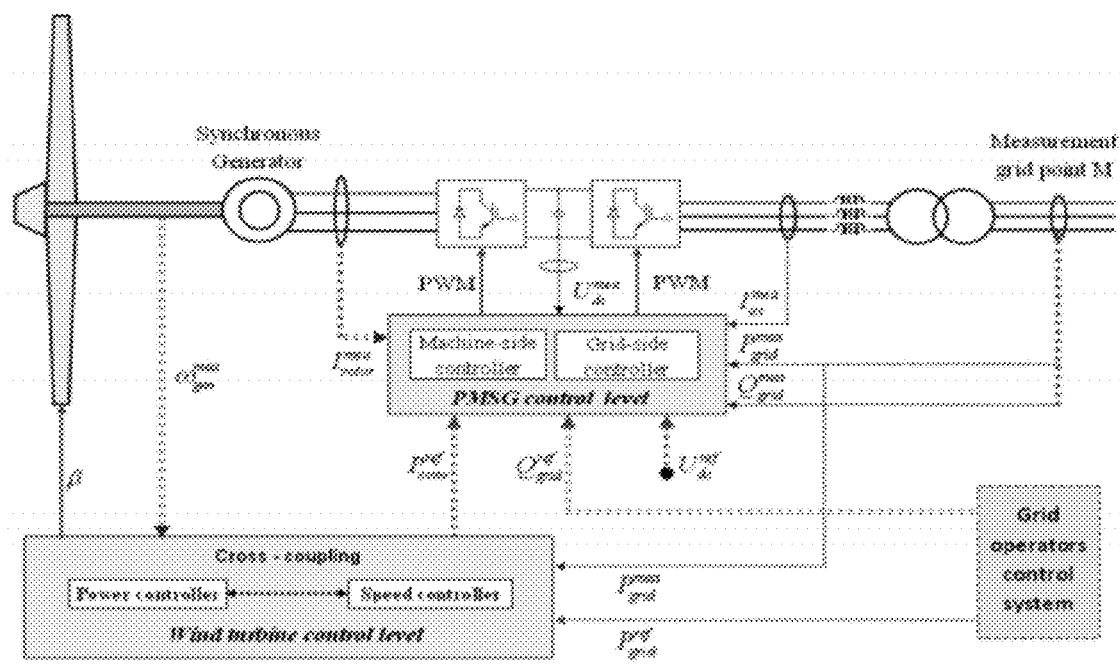
FIG. 1D illustrates a PMSG wind turbine with full-scale/fully-controllable PWM converters mainly comprising four parts: a wind turbine drive train, a permanent magnet synchronous generator, a back to back voltage source PWM converter and a wind turbine control system.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. The examples present performance evaluations for a comprehensive PMSG wind turbine system as shown in FIG. 1D, including PMSG control systems, machine-side converter, and grid-side converter. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

a. Control Evaluation in Transient Close-Loop Environment

Figure 25:
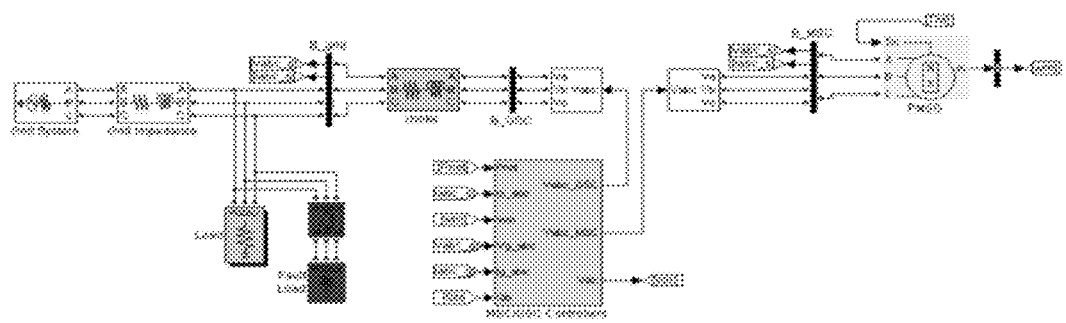
FIG. 25 illustrates a comprehensive PMSG wind turbine system in SimPowerSystems.

To evaluate the peak power tracking, reactive power and grid voltage support controls of a comprehensive PMSG wind turbine system, an integrated transient simulation system, including both the MSC and the GSC, is developed in SimPowerSystems by using power converter average model (FIG. 25), in which both steady and variable wind conditions are considered. The parameters used in the simulation study are shown in Tables 2 and 3. The grid impedance is the equivalent impedance referred to a PMSG wind turbine by considering the effect of 100 wind turbines operating at the same condition.

TABLE 2

Parameter of PMSG wind turbine

| Parameter | Value | Units |
| --- | --- | --- |
| $S_g$ (Generator rated power) | 2500 | kVA |
| f (frequency) | 60 | Hz |
| $V_g$ (Generator rated Voltage) | 575 | V |
| $R_s$ (stator resistance) | 0.0025 | p.u. |
| $L_{ls}$ (stator leakage inductance) | 0.02 | p.u. |
| Mutual inductance in d-axis, $L_{dm}$ | 0.43 | p.u. |
| Mutual inductance in q-axis, $L_{qm}$ | 0.48 | p.u. |
| Permanent magnet flux | 1.0 | p.u. |
| C (dc-link capacitor) | 60000 | μF |
| $R_f$ (grid-filter resistance) | 0.0012 | Ω |
| $L_f$ (grid-filter inductance) | 0.5 | mH |

TABLE 3

Relevant data of a wind power plant

| Equipment | Voltage ratio | R (pu) | X (pu) | Base Power |
| --- | --- | --- | --- | --- |
| Wind turbine transformer | 0.69/36 KV | 0.8% | 4.52% | 2 MW |
| PCC transformer | 36/200 KV | 0.5% | 6.5% | 150 MW |
| Transmission line | 200 KV | 2.54% | 11.9% | 300 MW |
| Grid transformer | 200/400 kV | 0.024% | 2.4% | 150 MW | b. Peak Power Tracking and Reactive Power Control

FIGS. 26A-26H demonstrate a case study of peak power tracking and reactive power control under a steady wind condition. Before t=6 s, the wind speed is 7 m/s and the reactive power reference is 0 kVar. After the system is stable, the output power of the wind turbine is very close to the maximum power that can be captured by the turbine at this wind speed (FIG. 26B). The net reactive power is effectively maintained at the reactive power reference (FIG. 26B), and the dc-link voltage is stabilized at the desired dc voltage reference of 1500V (FIG. 26D). At t=6 s when the grid reactive power demand changes to 200 kVar (generating), the net reactive power of the wind turbine quickly gets to the new reactive power reference (FIG. 26B). The dc-link voltage changes very little (FIG. 26D), showing the superior performance of the system under the direct-current vector control configuration. At t=8 s as the wind speed changes from 7 m/s to 9 m/s, the peak power tracking strategy recursively generates reference generator speed (FIG. 24A) while the MSC controller regulates the generator speed and turbine output power smoothly until the new maximum power point is reached (FIGS. 26A and 26B). With more power captured from the wind under a higher wind speed, the stator q-axis current $i_{sq}$ increases but the stator d-axis current $i_{sd}$ remains zero (minimum stator current control). This makes more power transferred to the dc-link capacitor, causing the dc-link voltage to increase (FIG. 26D). But, the direct-current vector control of the GSC quickly stabilizes the dc-link voltage to the reference value (FIG. 26D). At t=11 s when the reactive power reference changes to 500 kVar, the GSC turns into the optimal control mode by maintaining the dc-link voltage constant as the first priority while generating reactive power as much as possible (FIG. 26B). At t=14 s as the wind speed changes from 9 m/s to 8 m/s, the power transferred from MSC to GSC drops so that the GSC is able to generate more reactive power under the optimal control strategy (FIG. 26B). At t=17 s as the reactive power reference reduces to 300 kVar, the GSC returns to its normal control mode. For any other reactive power reference and wind speed variations, the integrated GSC and MSC control performs effectively for maximum power extraction, reactive power, and dc-link voltage controls with a high power quality on the three-phase stator and grid currents (FIGS. 26G-26H) using the optimal and direct-current vector control configuration.

c. Peak Power Tracking and Voltage Support Control

FIGS. 27A-27F and 28A-28F present PCC voltage support control for a low and a high voltage sag conditions, respectively. In both figures, the wind speed is 7 m/s and a voltage droop is generated in the simulation between 10 s and 12 s while the rest conditions are the same as those used in FIG. 26. The performance of the voltage support control of a PMSG wind turbine depends strongly on how much a voltage sag is and how much power is transferred from the PMSG to the grid.

Figures 27A, 27B, 27C, 27D, 27E, 27F:
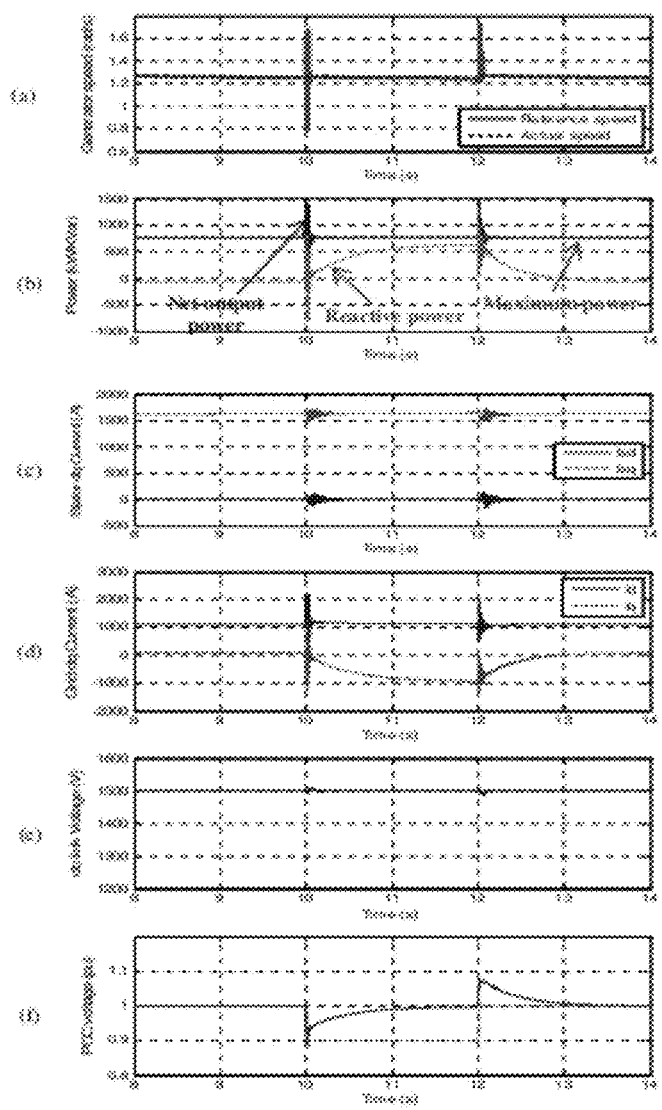
FIGS. 27A-27F illustrate GSC and MSC for maximum power extraction and voltage support controls during a low voltage droop.
Figures 28A, 28B, 28C, 28D, 28E, 28F:
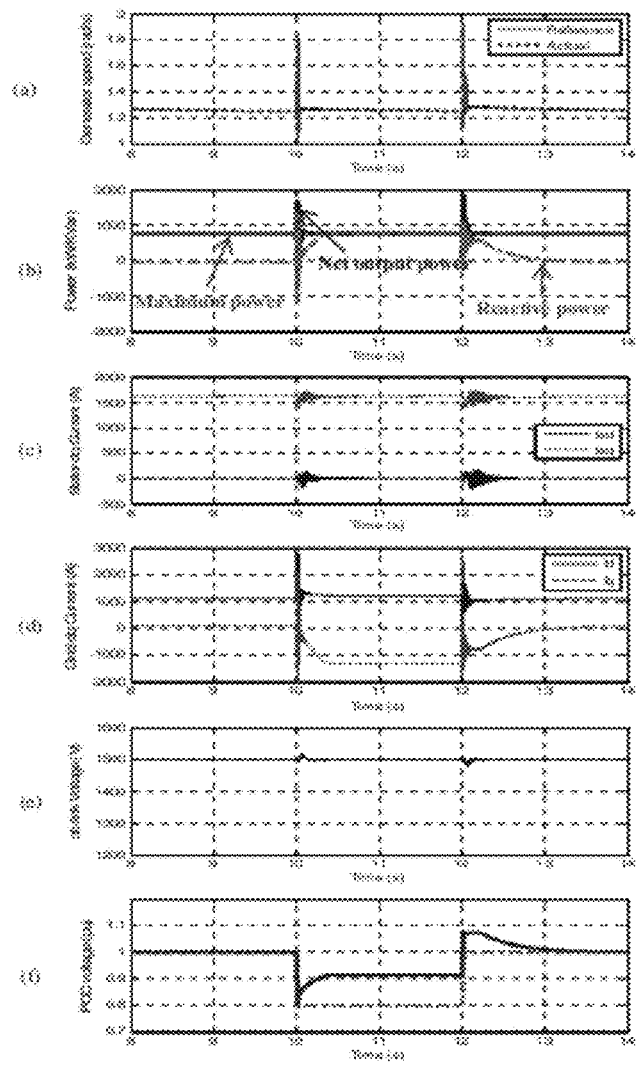

For a low voltage sag on the PCC bus (FIGS. 27A-27F) at a low wind speed, the integrated GSC and MSC control works properly for peak power tracking (FIG. 27B), dc-link voltage (FIG. 27E), and the PCC bus voltage control (FIG. 27F). At the start of the voltage sag, there is a sudden change of the PCC voltage (FIG. 27F), causing a spike in the instantaneous active and reactive power transferred to the grid due to a distortion of grid three-phase current. However, the integrated GSC and MSC control under the direct-current vector control structure quickly stabilize the dc-link voltage and recover the PCC bus voltage to the rated value. During the voltage support control, the PMSG maximum power extraction is not affected much (FIGS. 27B and 27C). Thus, the GSC d-axis current $i_d$ remains almost unchanged while the q-axis current $i_q$ becomes more negative to generate reactive power for PCC bus voltage support. When the voltage sag is cleared at t=12 s, the extra generating reactive power first causes a boost of the PCC voltage. Then, the integrated GSC and MSC control under the direct-current vector control configuration quickly recover the PMSG system to the normal operation with very small oscillations.

Figures 28A, 28B, 28C, 28D, 28E, 28F, 28G, 28H:
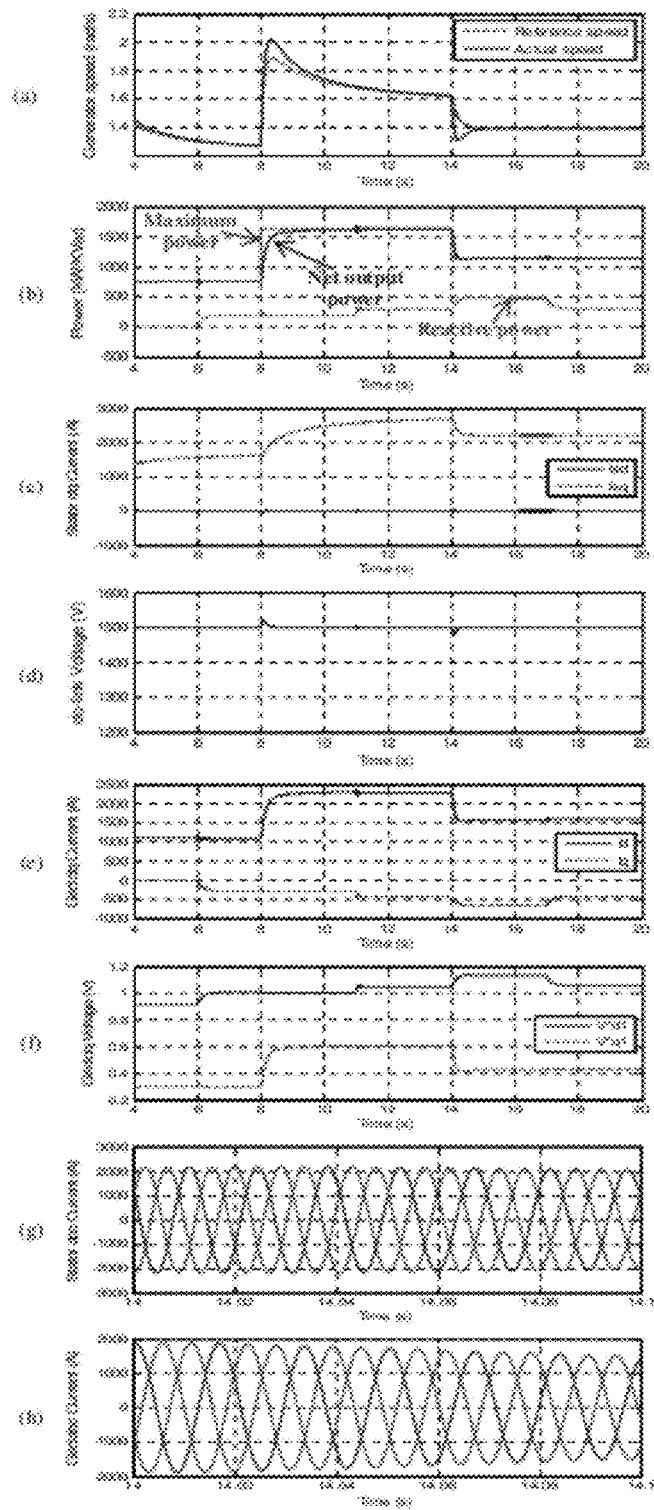
FIGS. 28A-28F illustrate GSC and MSC for maximum power extraction and voltage support controls during a moderate voltage droop.

For a moderate voltage sag on the PCC bus (FIGS. 28A-28F), more generating reactive power is needed to boost the PCC voltage. However, due to the rated current or converter linear modulation constraint, the GSC, unable to generate the required reactive power, operates in the optimal control mode by maintaining the dc-link voltage as the first priority (FIG. 28E) while generating the reactive power as much as possible (FIGS. 28B and 28D). Therefore, the final PCC bus voltage after the voltage support control is lower than the rated PCC voltage of 1 pu (FIG. 28F). Since the dc-link voltage is kept almost constant using the optimal and direct-current vector control strategy, the operation of the synchronous generator and the maximum wind power extraction is nearly unaffected (FIGS. 28A, 28B, and 28C), demonstrating strong short-circuit ride through capability of the PMSG wind turbine under the direct-current vector control configuration.

d. GSC and MSC Control Under Variable and Gust Wind

Figure 23A:
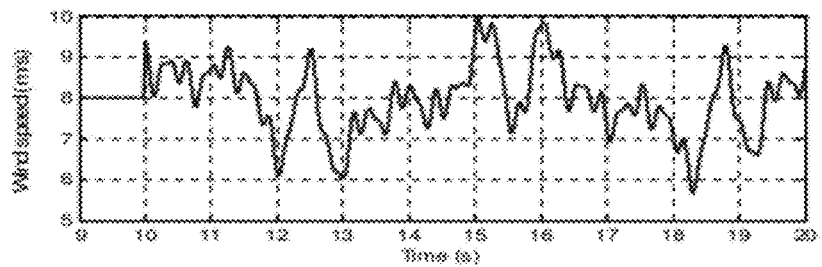
FIGS. 23A, 23B, 23C, 23D and 23E illustrate PMSG maximum power extraction control under variable and gust wind conditions.
Figure 23B:
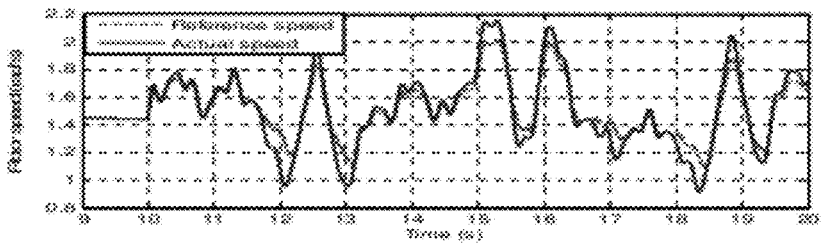
Figure 23C:
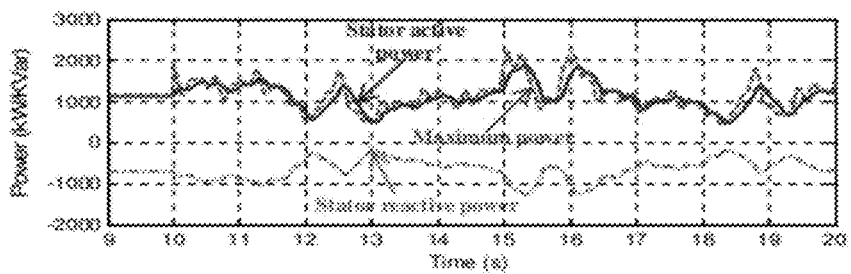
Figure 23D:
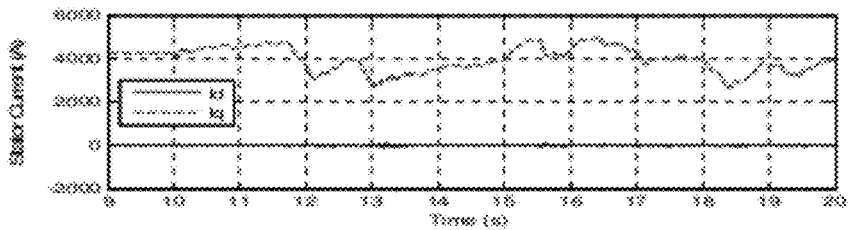
Figure 23E:
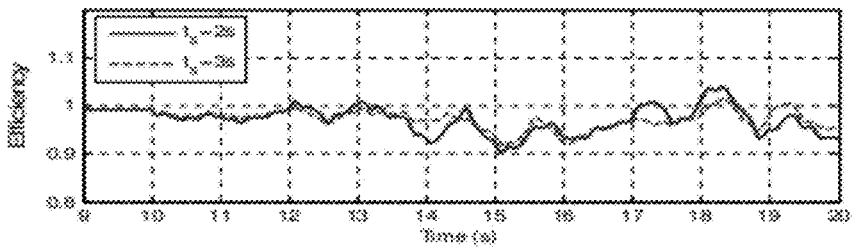
Figures 29A, 29B, 29C, 29D, 29E, 29F:
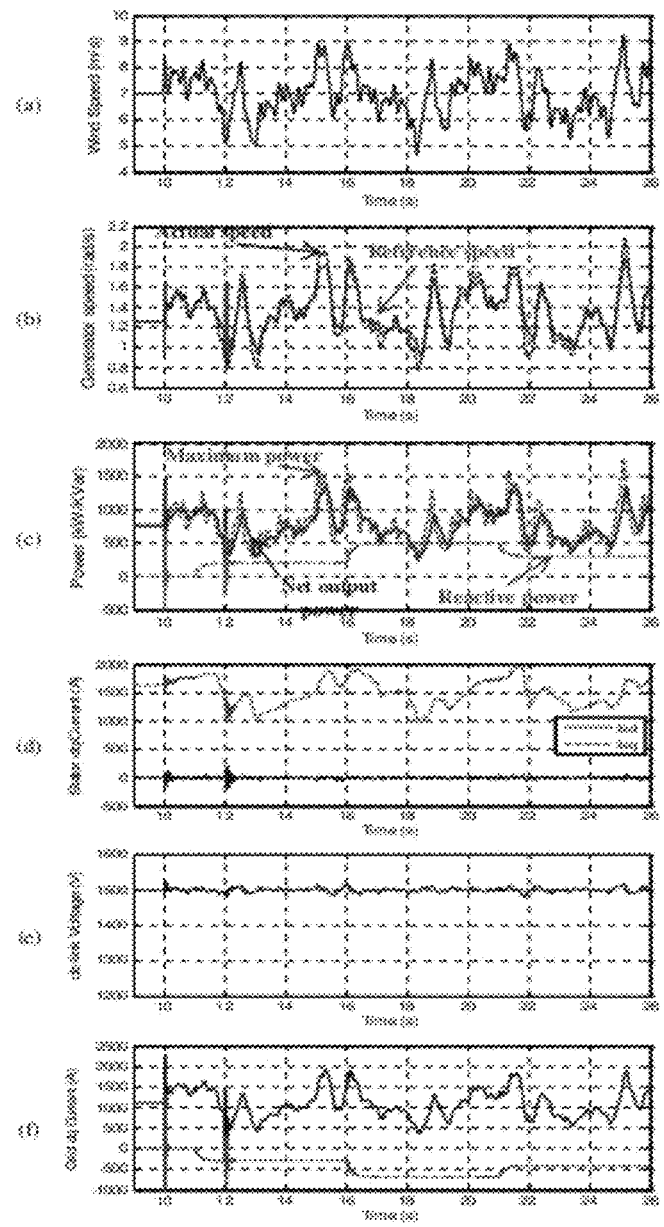
FIGS. 29A-29F illustrate GSC and MSC for maximum power extraction and reactive power controls under variable and gust wind.

FIGS. 29A-29F show the performance of the integrated GSC and MSC control for peak power tracking and reactive power control under a variable and gust wind condition (FIG. 23A). The variable and gust wind starts at t=10 s while the rest conditions are similar to those used in FIG. 24. Before t=10 s, the wind speed is 7 m/s. At t=10 s, the variable and gust wind speed is applied (FIG. 29A). Under the variable and gust wind condition, the maximum available power that can be extracted by a PMSG wind turbine fluctuates sharply as the wind speed varies. However, the turbine rotating speed, the net output power, and the generator electromagnetic torque shift smoothly using a recursive virtual lookup table peak power tracking control strategy. The net output power of the wind turbine follows the maximum available power properly while the influence of the gust wind is restrained as shown by FIG. 29C, showing the effectiveness of the recursive virtual peak power tracking control mechanism in variable and gust wind conditions under the direct-current vector control structure. The stator q-axis current $i_{sq}$ changes with the wind speed for maximum power extraction while the stator d-axis current $i_{sd}$ is maintained at zero (FIG. 29D). The variation of the active power transferred from the synchronous generator to the grid through the GSC causes an oscillating dc-link voltage. But, in the optimal and direct-current vector control configuration, the dc-link voltage is properly maintained around the reference voltage with very small fluctuation. The control of grid reactive power is based on the GSC optimal control strategy. In other word, a grid reactive power demand may not be satisfied if the active power transferred to the grid is high under a high wind speed condition.

Figure 30:
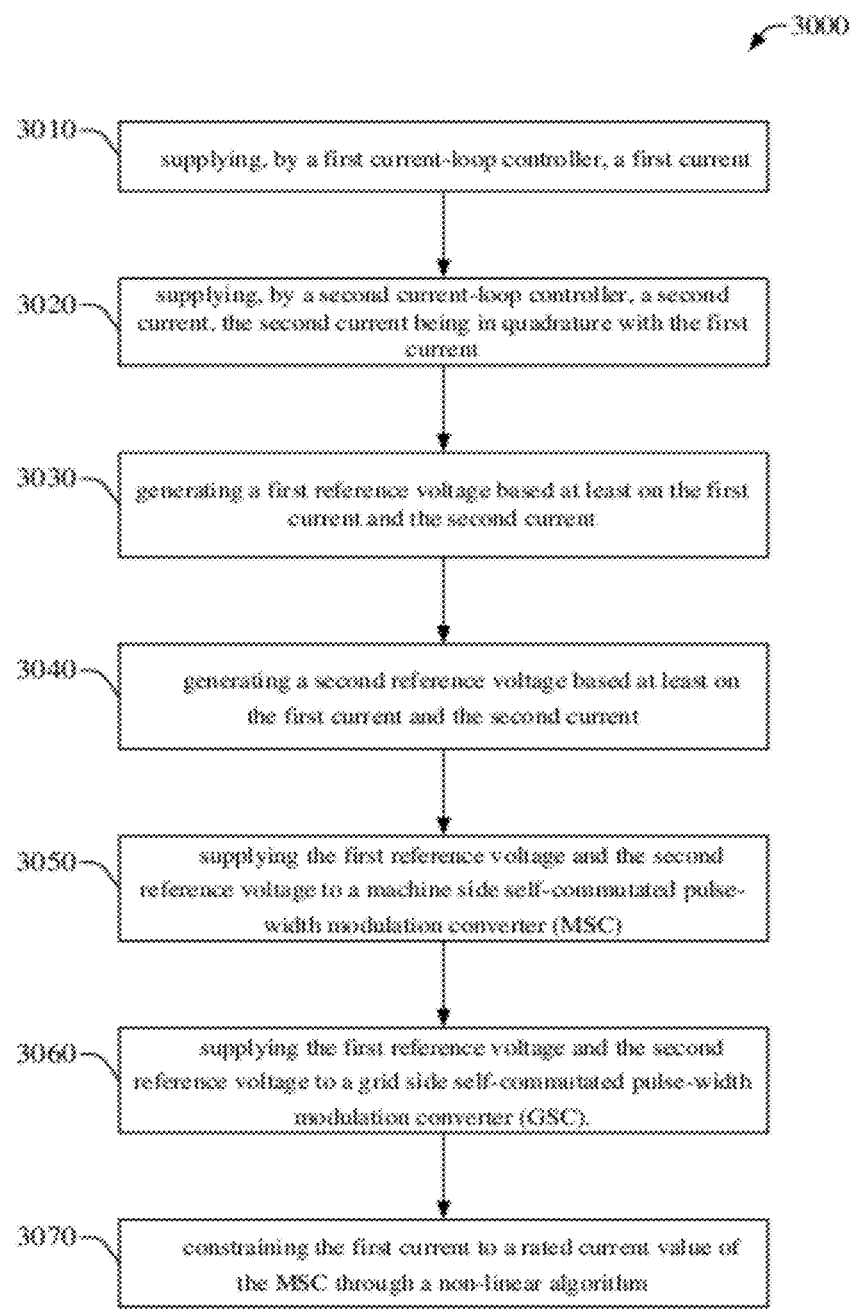
FIG. 30 illustrates an exemplary method for controlling a wind turbine according to aspects of the subject disclosure.
Figure 31:
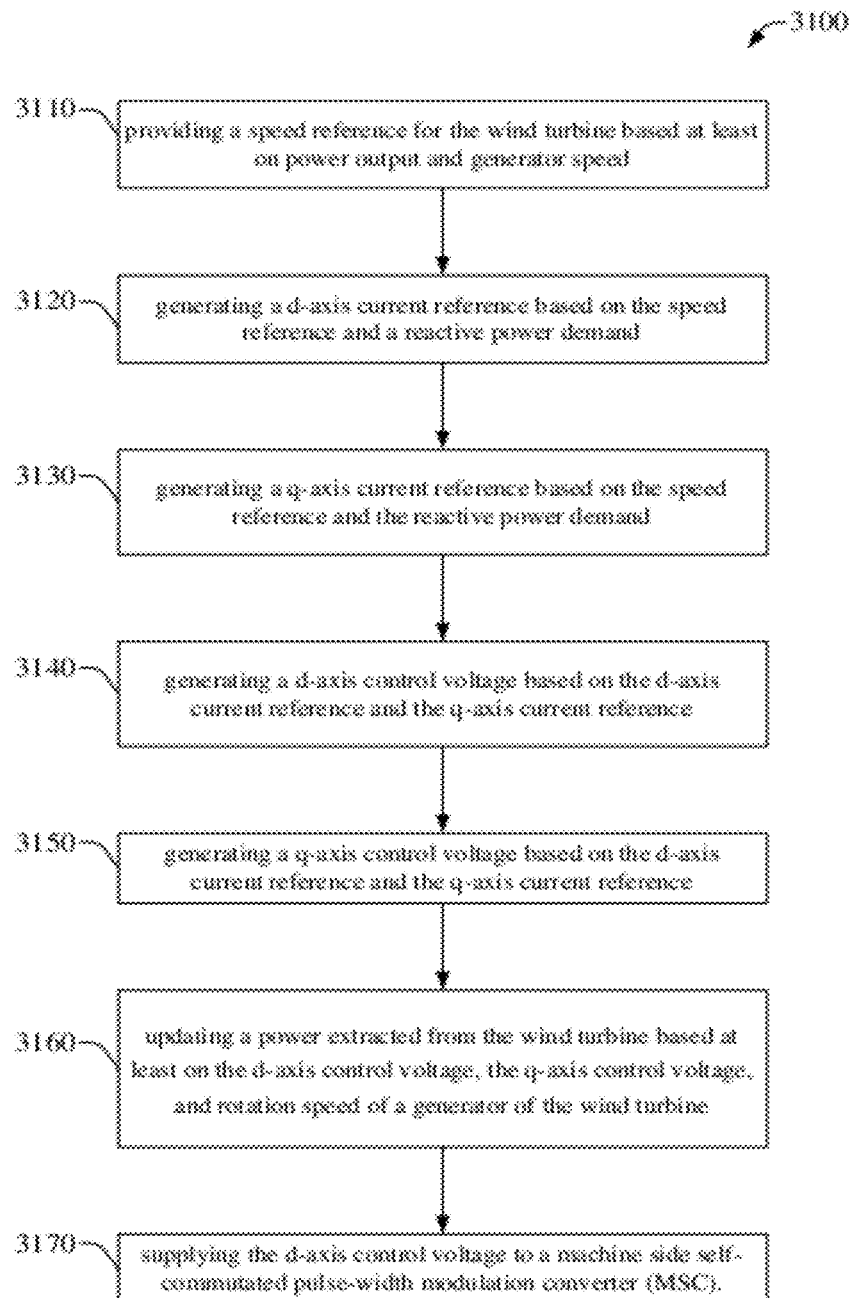
FIG. 31 illustrates an exemplary method for regulating power extraction from a wind turbine, such as a PMSG wind turbine, in accordance with aspects described herein.

Various features related to the functionality of the systems of the disclosure can be better appreciated in connection with the flowcharts in FIGS. 30-31. As described herein the blocks in such flowchart can be implemented as hardware, software, or a combination of hardware and software.

FIG. 30 illustrates an exemplary method 3000 for controlling a wind turbine according to aspects of the subject disclosure. The exemplary method 3000 can embody a direct-current d-q vector control method as described herein. At block 3010, a first current is supplied by a first current-loop controller. At block 3020, a second current (e.g., a d-axis current) is supplied by a second current-loop controller. In one aspect, such second current is in quadrature with the first current (e.g., a d-axis current). At block 3030, a first reference voltage is generated based at least on the first current and the second current. At block 3040, a second reference voltage is generated based at least on the first current and the second current. At block 3050, the first reference voltage and the second reference voltage are supplied to a machine side self-commutated puls-width modulation converter (MSC). At block 3060, the first reference voltage and the second reference voltage are supplied to a grid side self-commutated pulse-width modulation converter (GSC). At block 3070, the first current is constrained to a rated current value of the MSC through a non-linear algorithm, as described herein.

FIG. 31 is an exemplary method 3100 for regulating power extraction from a wind turbine, such as a PMSG wind turbine, in accordance with aspects described herein. In one aspect, the power extraction can be regulated to maximize the power output attained from the wind turbine. At block 3110, a speed reference for the wind turbine based at least on power output and generator speed is provided (e.g., provided to a control unit or other controller). The generator for which speed is provided can be part of the wind turbine. At block 3120, a d-axis current reference is generated based on the speed reference and a reactive power demand. At block 3130, a q-axis current reference is generated based on the speed reference and the reactive power demand. It should be appreciated that the power demand can be determined from a load functionally coupled to the wind turbine. At block 3140, a d-axis control voltage based on the d-axis current reference and the q-axis current reference is generated. At block 3150, a q-axis control voltage is generated based on the d-axis current reference and the q-axis current reference. At block 3160, a power extracted from the wind turbine is updated based at least on the d-axis control voltage, the q-axis control voltage, and rotation speed of a generator of the wind turbine. At block 3170, the d-axis control voltage is supplied to a MSC.

Figure 32:
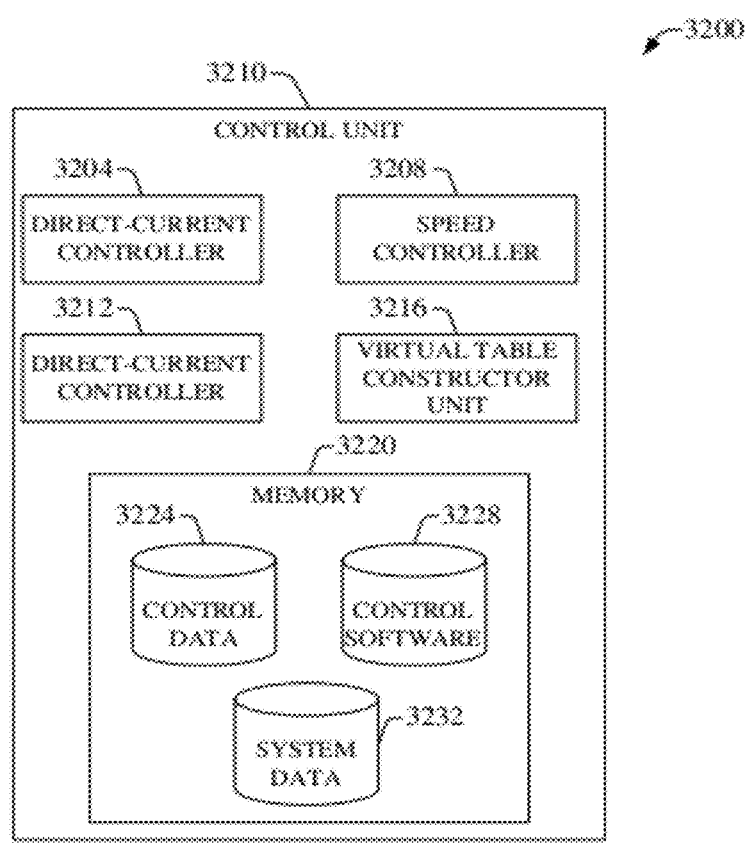
FIG. 32 illustrates an exemplary embodiment of a control system that can operate in accordance with various aspects of the subject disclosure.

FIG. 32 illustrates an exemplary embodiment of a control system 3200 that can operate in accordance with various aspects of the subject disclosure. The control system comprises the control unit 3120, which can comprise a first current-loop controller, which can be a direct-current controller 3204, for supplying a d-axis current. In addition, control unit 3210 can comprise a second current-loop controller, which can be a direct-current controller 3212, for supplying a q-axis current. In one aspect, the control unit 3210 can generate a d-axis reference voltage and a q-axis reference voltage based at least on the d-axis current and the q-axis current. To at least such end, the control unit 3210 can execute computer-executable instructions retained in memory 3220 within one or more memory elements represented as control software 3228. In another aspect, the control unit can supply the d-axis reference voltage and the q-axis reference voltage to a machine side self-commutated pulse-width modulation converter (MSC) (not shown in FIG. 32). In another aspect, in the control system 3200, the control unit 3210 can supply the d-axis reference voltage and the q-axis reference voltage to a grid side self-commutated pulse-width modulation converter (GSC). It should be appreciated that while illustrated as contained within the control unit 3210, one or more of direct current controller 3204 or direct-current controller 3212 can be external to the control unit 3210. In alternative embodiments, control unit 3210 can be integrated, at least in part, in one or more of direct current controller 3204 or direct-current controller 3212.

Control unit 3120 can comprise a speed controller 3208 for providing a speed reference for the wind turbine based at least on power output and generator speed. In additional or alternative embodiments, the speed controller can be external and functionally coupled to the control unit 3210. In certain embodiments, control unit 3210 can update (generate, modify, delete, etc.) a power extracted from a wind turbine based at least on the d-axis reference voltage, the q-axis reference voltage, and rotation speed of a generator of the wind turbine. In one aspect, to at least such end, control unit 3210 (e.g., through a processor (not shown) therein or functionally coupled thereto) can execute one or more computer-executable instructions that are part of control software 3228, and exploit control data 3224 or system data 3232. As described herein, control unit 3210 also can dynamically generates a virtual lookup table, the virtual lookup table having a plurality of dynamic traces for transition from different operating points of the turbine towards a substantially maximum power extraction point. Generation of such virtual lookup table can be part of implementing a non-linear algorithm for constraining the magnitude of d-axis current or q-axis current supplied to a PWM converter (e.g., MSC, GSC).

It should be appreciated that control unit 3210 can implement other functionality described herein in connection with optimal and smart control of a PMSG wind turbine or most any wind turbine. While not shown in FIG. 32, the various functional elements that are part of control unit 3210 can be functionally coupled through a bus as described herein.

CONCLUSION

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims or inventive concepts.

What is claimed is:

1. A method for direct-current control of a permanent magnet synchronous generator (PMSG) wind turbine comprising:
    receiving, by a speed-loop controller, a PMSG output power signal and a generator rotating speed signal, wherein the PMSG output power signal indicates current power being generated by the PMSG generator of the wind turbine and the generator rotating speed signal indicates current rotating speed of the PMSG generator;
    determining, by the speed-loop controller using a virtual lookup table, a speed reference signal from the PMSG output power signal;
    outputting, by the speed-loop controller, a torque reference depending on an error signal by comparing the speed reference signal and the generator rotating speed signal;
    estimating, by the speed-loop controller, a reference q-axis current signal, the reference q-axis current signal being in quadrature with a d-axis current signal;
    receiving by a d-axis current-loop controller, a reference d-axis current signal and a present d-axis current being generated by the PMSG generator of the wind turbine;
    receiving by a q-axis current-loop controller, the reference q-axis current signal and a present q-axis current being generated by the PMSG generator of the wind turbine;
    outputting, by the d-axis current-loop controller, a d-axis current regulating signal;
    outputting, by the q-axis current-loop controller, a q-axis current regulating signal;
    computing a d-axis reference voltage based on the d-axis current regulating signal and the q-axis current regulating signal;
    computing a q-axis reference voltage based on the d-axis current regulating signal and the q-axis current regulating signal; and
    controlling reactive power of the wind turbine using the q-axis reference voltage and controlling torque of the wind turbine using the d-axis reference voltage, wherein the wind turbine comprises the permanent magnet synchronous generator (PMSG) wind turbine.

2. The method of claim 1, further comprising supplying the d-axis reference voltage and the q-axis reference voltage to a machine side self-commutated pulsewidth modulation converter (MSC).

3. The method of claim 2, further comprising constraining the reference d-axis current signal to a targeted current reference value of the MSC through a non-linear algorithm.

4. The method of claim 3, wherein the constraining step comprises minimizing a magnitude of a difference between a target d-axis current reference signal and the reference d-axis current signal, while attaining a target value for the reference q-axis current signal.

5. The method of claim 2, further comprising constraining the q-axis reference voltage signal to a targeted q-axis voltage reference value of the MSC through a non-linear algorithm.

6. The method of claim 5, wherein the constraining step comprises minimizing a magnitude of a difference between a target q-axis reference voltage signal and the q-axis reference voltage signal, while attaining a target value for the d-axis reference voltage signal.

7. The method of claim 1, further comprising applying the q-axis current regulating signal for torque control.

8. The method of claim 1, further comprising applying the d-axis current regulating signal for reactive power control.

9. The method of claim 1, wherein supplying the d-axis current regulating signal comprises integrating two or more of PID control, fuzzy control, or adaptive control.

10. The method of claim 1, wherein supplying the q-axis current regulating signal comprises integrating two or more of PID control, fuzzy control, or adaptive control.

11. The method of claim 1, further comprising:
    updating a power extracted from the PMSG wind turbine based at least on the d-axis control voltage, the q-axis control voltage, and the rotation speed of the generator of the PMSG wind turbine.

12. The method of claim 11, wherein the updating step comprises processing the power output signal associated with the extracted power with a low-pass filter.

13. The method of claim 1, wherein the speed reference is extracted from a virtual lookup table comprised of power versus angular speed.

14. The method of claim 1, further comprising dynamically forming the virtual lookup table, the virtual lookup table having a plurality of dynamic traces for transition from different operating points of the turbine towards a substantially maximum power extraction point.

15. A control system comprising:
    a first current control controller for supplying a d-axis current regulating signal;
    a second current control controller for supplying a q-axis current regulating signal;
    a speed-loop controller, wherein the speed-loop controller receives a PMSG output power signal and a generator rotating speed signal, determines a speed reference signal from the PMSG output power signal and the generator rotating speed signal using a virtual lookup table, outputs a torque reference depending on an error signal by comparing the speed reference signal and the generator rotating speed signal, and estimates a reference q-axis current signal, the q-axis current signal being in quadrature with the d-axis current signal; and a control unit for computing a d-axis reference voltage based on the d-axis current regulating signal and the q-axis current regulating signal and for computing a q-axis reference voltage based on the d-axis current regulating signal and the q-axis current regulating signal, wherein the control unit controls reactive power of the wind turbine using the q-axis reference voltage and controls torque of the wind turbine using the d-axis reference voltage of a permanent magnet synchronous generator (PMSG) wind turbine.

16. The control system of claim 15, wherein the control unit supplies the d-axis reference voltage and the q-axis reference voltage to a machine side self-commutated pulse-width modulation converter (MSC).

17. The control system of claim 15, wherein the control unit supplies the d-axis reference voltage and the q-axis reference voltage to a grid side self-commutated pulse-width modulation converter (GSC).

18. The control system of claim 15, wherein the speed-loop controller dynamically generates the virtual lookup table, the virtual lookup table having a plurality of dynamic traces for transition from different operating points of the PMSG turbine towards a substantially maximum power extraction point.

* * * * *